(12) United States Patent  
Shi et al.

(10) Patent No.: US 11,941,724 B2  
(45) Date of Patent: Mar. 26, 2024

(54) MODEL INFERENCE METHOD AND APPARATUS BASED ON GRAPHICS RENDERING PIPELINE, AND STORAGE MEDIUM

(71) Applicant: HUAWEI TECHNOLOGIES CO., LTD., Guangdong (CN)

(72) Inventors: Xindong Shi, Hangzhou (CN); Shu Wang, Hangzhou (CN); Jiangzheng Wu, Hangzhou (CN); Mingwei Lu, Hangzhou (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 117 days.

(21) Appl. No.: 17/665,678

(22) Filed: Feb. 7, 2022

(65) Prior Publication Data

US 2022/0156878 A1 May 19, 2022

Related U.S. Application Data

(63) Continuation of application No. PCT/CN2020/100759, filed on Jul. 8, 2020.

(30) Foreign Application Priority Data

Aug. 8, 2019 (CN) .......................... 201910730619.0

(51) Int. Cl.
*G06N 3/04* (2023.01)
*G06N 3/08* (2023.01)
(Continued)

(52) U.S. Cl.
CPC .................. *G06T 1/20* (2013.01); *G06T 1/60* (2013.01); *G06T 3/40* (2013.01); *G06T 7/40* (2013.01)

(58) Field of Classification Search
CPC .... G06T 1/60; G06T 7/40; G06T 1/20; G06T 3/40; G06T 13/00; G06T 13/80;
(Continued)

(56) References Cited

U.S. PATENT DOCUMENTS 10,304,154 B2 * 5/2019 Appu ..................... G06N 3/063  
11,110,348 B2 * 9/2021 Lalonde ............... G06F 9/5066  
(Continued)

FOREIGN PATENT DOCUMENTS

CN 104036451 A 9/2014  
CN 105741228 A 7/2016  
(Continued)

OTHER PUBLICATIONS

Anonymous: "Convolutional Layers Keras Documentation" Apr. 5, 2019 (Apr. 5, 2019) total: 19 pages.
(Continued)

*Primary Examiner* — Wesner Sajous

(57) ABSTRACT

This application provides a model inference method and apparatus based on a graphics rendering pipeline, and a storage medium for model inference based on a graphics rendering pipeline. The method includes: obtaining an instruction stream in a render thread; extracting and saving texture data information from the instruction stream, where the texture data information includes texture data; and inputting the texture data information to a graphics processing unit (GPU) rendering pipeline, where the GPU rendering pipeline is used to perform GPU model-based inference on the texture data based on a GPU model to obtain an inference result of the texture data, and the GPU model is a model running in a GPU. This implements model inference on the texture data, and avoids conversion of the texture data into another data type, thereby reducing I/O memory overheads.

20 Claims, 13 Drawing Sheets

(51) Int. Cl.
*G06T 1/20* (2006.01)
*G06T 1/60* (2006.01)
*G06T 3/40* (2006.01)
*G06T 7/40* (2017.01)
*G06V 10/82* (2022.01)

(58) Field of Classification Search
CPC ........ G06T 9/001; G06N 3/045; G06N 3/063; G06N 3/044; G06N 3/084; G06F 9/46; G06F 18/231; G06F 24/133; G06V 30/274; G06V 10/454; G06V 10/82; G06V 30/19173
See application file for complete search history.

(56) References Cited

U.S. PATENT DOCUMENTS

| | | | |
|---|---|---|---|
| 2014/0327698 A1 | 11/2014 | Schoenefeld et al. | |
| 2015/0091931 A1 | 4/2015 | Pelton et al. | |
| 2019/0147296 A1* | 5/2019 | Wang | G06F 18/2148 382/157 |
| 2020/0234137 A1* | 7/2020 | Chen | G06N 3/084 |

FOREIGN PATENT DOCUMENTS

| | | |
|---|---|---|
| CN | 107133909 A | 9/2017 |
| CN | 108182471 A | 6/2018 |
| CN | 109002744 A | 12/2018 |
| CN | 109816761 A | 5/2019 |
| CN | 109933429 A | 6/2019 |
| CN | 109934197 A | 6/2019 |
| CN | 110223215 A | 9/2019 |
| CN | 110928610 A | 3/2020 |
| EP | 3396599 A1 | 10/2018 |

OTHER PUBLICATIONS

Extended European Search Report issued in EP20850238.5, dated Feb. 2, 2023, 7 pages.
Office Action issued in CN201910730619.0, dated Apr. 2, 2023, 8 pages.
International Search Report issued in PCT/CN2020/100759, dated Oct. 12, 2020, 6 pages.
Written Opinion issued in PCT/CN2020/100759, dated Oct. 12, 2020, 8 pages.

* cited by examiner

MODEL INFERENCE METHOD AND APPARATUS BASED ON GRAPHICS RENDERING PIPELINE, AND STORAGE MEDIUM

CROSS-REFERENCE TO RELATED APPLICATIONS

This application is a continuation of International Application No. PCT/CN2020/100759, filed on Jul. 8, 2020, which claims priority to Chinese Patent Application No. 201910730619.0, filed on Aug. 8, 2019. The disclosures of the aforementioned applications are hereby incorporated by reference in their entireties.

TECHNICAL FIELD

This application relates to the field of computer technologies, and in particular, to a model inference method and apparatus based on a graphics rendering pipeline, and a storage medium for model inference based on a graphics rendering pipeline.

BACKGROUND

With continuous iteration of hardware devices on a mobile terminal, more mobile applications are integrated with an artificial intelligence (AI) function, so that the mobile terminal is more intelligent, and provides more natural and user-friendly services for users. In terms of images and videos, applications such as facial recognition, scene recognition, text recognition, and image super-resolution provide the mobile terminal with core function support such as secure unlocking, reading and retrieval, and video beautification. However, an AI function foundation usually depends on an inference platform of a neural network. As a result, on a hardware hashrate bearing, the AI function foundation also continuously evolves from a central processing unit (CPU) and a graphics processing unit (GPU) to a neural-network processing unit (NPUGPU). To implement AI processing on video stream data by using a neural-network processing unit (Neural Processing Unit, NPU), in a current ARM (Advanced RISC Machines) architecture, usually all processors use a unified double data rate (Double Data Rate, DDR) storage space. FIG. 1 is a schematic diagram of unified addressing in a non-limiting exemplary ARM framework. As shown in FIG. 1, each of a CPU, a GPU, and an NPU has a corresponding memory address segments, and video stream data is displayed in a GPU address segment. The video stream data needs to be sent to an NPU address segment for corresponding model inference computation, and finally output back to the GPU address segment for display. As shown in FIG. 1, in a process of sending frame data 1 (for example, frame data) in the GPU to the NPU, the CPU needs to first read the frame data from the GPU address segment, namely, data 2 is obtained, and then copies the read data 2 to the NPU address segment, namely, data 3 is obtained. Similarly, in a process of sending data 3' obtained after inference computation by the NPU back to the GPU for display, data 3' needs to be read by the CPU as data 2', and then data 2' is copied to the GPU address segment as data 1', to implement AI processing and display of the video stream data. In the foregoing processes, data of each frame needs to be transferred for a plurality of times, which causes relatively high input/output (I/O) overheads.

In the conventional technology, to reduce I/O overheads, in addition to an NPU used as a hashrate of model inference computation of a mobile terminal, a CPU/GPU is also used in the industry for model inference computation. In comparison, the GPU is more suitable for model inference computation in parallel computing than the CPU. TensorFlow Lite is a common model inference framework for a mobile device. TensorFlow Lite is based on TensorFlow. A corresponding TensorFlow model can be converted into a model corresponding to TensorFlow Lite by using a corresponding converter. A GPU-based implementation of TensorFlow Lite is used as an example. A form of input data accessible to the GPU needs to be of a shader storage buffer object (SSBO) type because its inference computation on the GPU is implemented based on a Compute shader. SSBO is a common form of input and output data for the Compute shader. However, for video stream data, when a video is displayed, data accessible to the GPU often exists in a data form of texture data (texture). Therefore, if TensorFlow Lite needs to be used to process the video stream data, data format conversion is inevitable. The conversion cannot be directly completed on the GPU side, and the CPU is required to control the conversion. FIG. 2 is a schematic diagram of non-limiting, exemplary conversion between an SSBO data type and a texture data type. As shown in FIG. 2, when video stream data is processed, video frame data, namely, data 1 of the texture data type, needs to be first read by a CPU as data 2, and then data 2 of the SSBO data type needs to be written into a memory corresponding to a GPU, to obtain data 3. Similarly, data 3' of the SSBO data type that is computed by using TensorFlow Lite needs to be read by the CPU as data 2', and then converted into data 1' of the texture data type, so that data 1' can be normally sent for display.

Therefore, in the conventional technology, inference computation of the TensorFlow Lite framework on the GPU is implemented based on the Compute shader. It is limited that a fixed input and output data format needs to be an SSBO format. For a scenario in which a texture type is raw data, format conversion needs to be performed on data of the texture type in the CPU, which causes a large quantity of I/O memory overheads.

SUMMARY

Example embodiments of this application provides a model inference method and apparatus based on a graphics rendering pipeline, and a storage medium for model inference based on a graphics rendering pipeline, to implement model inference on data of a texture type, and avoid format conversion of the data of the texture type, thereby reducing I/O memory overheads.

According to a first aspect, an embodiment of this application provides a model inference method based on a graphics rendering pipeline, including:

obtaining an instruction stream in a render thread; extracting and saving texture data information from the instruction stream, where the texture data information includes texture data; and inputting the texture data information to a graphics processing unit (GPU) rendering pipeline, where the GPU rendering pipeline is used to perform GPU model-based inference on the texture data to obtain an inference result of the texture data, and the GPU model is a model running in a GPU.

By obtaining the texture data information from the instruction stream in the current render thread, and inputting the texture data into the GPU rendering pipeline, the GPU rendering pipeline may include phases such as vertex shader, cropping, screen mapping, triangle setting, triangle traversal, fragment shader, and merging phase. To implement rendering and display of an image, the GPU rendering pipeline in this embodiment is used to perform GPU model-based inference on the texture data, to obtain the inference result of the texture data. Compared with the conventional technology, because the GPU rendering pipeline is used to perform model inference on the texture data, instead of a Compute shader to implement inference on the texture data, conversion of the texture data into an SSBO data type is avoided, so that the Compute shader performs inference on the texture data. In addition, after GPU model-based inference is performed on the texture data in the GPU rendering pipeline, the inference result is converted into a texture data format, which avoids data type conversion of converting the inference result in which the data type is an SSBO into a texture type after the Compute shader completes inference in the conventional technology. Therefore, in this embodiment, not only model inference is implemented on the texture data, but also conversion of the texture data into another data type is avoided, thereby reducing I/O memory overheads.

Optionally, the model inference method based on a graphics rendering pipeline provided in this embodiment further includes:

loading the GPU model to a memory.

In this embodiment, the GPU model is a model running in the GPU, and by loading the GPU model, the GPU can execute the GPU model, thereby implementing inference computation based on the GPU model.

Optionally, the loading the GPU model to a memory includes:

obtaining a layered structure of a training model and parameters of each layer in the render thread; generating, based on the layered structure and the parameters of each layer, a fragment shader corresponding to each layer in the layered structure; and loading the fragment shader to the memory.

In this embodiment, the fragment shader corresponding to each layer in the layered structure is generated based on the layered structure of the training model and the parameters of each layer in the render thread, to implement conversion of the training model in the current render thread into the GPU model, so that the GPU can implement inference on the texture data by executing the fragment shader.

Optionally, the loading the GPU model to a memory includes:

obtaining a layered structure of a training model and parameters of each layer in the render thread; merging the layered structure and the parameters of each layer based on the layered structure to obtain a merged layered structure and a merged parameter of each layer; generating, based on the merged layered structure and the merged parameter of each layer, a fragment shader corresponding to each layer in the merged layered structure; and loading the fragment shader to the memory.

In this embodiment, the layered structure of the training model and the parameters of each layer in the current render thread are merged, and the fragment shader corresponding to each layer in the merged layered structure is determined based on the merged layered structure and the merged parameter of each layer. This not only implements conversion of the training model in the current render thread into the GPU model, so that the GPU can implement inference on the texture data by executing the fragment shader, but also reduces storage of intermediate node results, thereby further reducing I/O overheads.

Optionally, the merging the layered structure and the parameters of each layer based on the layered structure includes:

determining a plurality of branch layers and a plurality of 1*1 convolution kernels in the layered structure; and merging the plurality of branch layers and multi-layer parameters corresponding to the plurality of branch layers, and/or merging the plurality of 1*1 convolution kernels and a plurality of parameters corresponding to the plurality of 1*1 convolution kernels.

In this embodiment, by merging the plurality of branch layers in the layered structure, obtaining data of an upper-layer node for a plurality of times is avoided, and I/O overheads are reduced. By merging the plurality of 1*1 convolution kernels, storage of an inference result for the upper-layer node is avoided, and I/O overheads are further reduced.

Optionally, the texture data information further includes a texture ID of the texture data in a GPU memory, and before the inputting the texture data information to a graphics processing unit (GPU) rendering pipeline, where the GPU rendering pipeline is used to perform GPU model-based inference on the texture data, the method further includes:

determining an input data position and an output data position of the fragment shader of each layer based on the texture ID and the GPU model, where the GPU rendering pipeline is used to sequentially execute the fragment shader of each layer based on the input data position and the output data position of the fragment shader of each layer.

In this embodiment, by sequentially executing the fragment shader of each layer by using the GPU rendering pipeline based on the input data position information and the output data position information of the fragment shader of each layer, model inference is implemented on the texture data.

Optionally, before the inputting the texture data information to a graphics processing unit (GPU) rendering pipeline, the method further includes:

preprocessing the texture data information; and after the obtaining an inference result of the texture data, the method further includes: post-processing the inference result.

Optionally, the texture data information further includes a first save format of the texture data in the GPU memory and a first image size of the texture data, and the preprocessing the texture data information includes:

converting the first image size into a second image size based on the GPU model; and converting the first save format into a second save format required by the GPU model; and the post-processing the inference result, includes:

converting the second image size of the texture data into the first image size, and converting the second save format of the texture data into the first save format.

In this embodiment, by preprocessing the texture data information, the image size and the save format of the texture data are unified, and model inference on the texture data is further ensured. By post-processing the inference result, the image size and the save format of the inference result are restored, to output the inference result to the render thread for rendering and display.

Optionally, before the inputting the texture data information to a graphics processing unit (GPU) rendering pipeline, the method further includes:

obtaining and saving a context state of the render thread, an ID of a texture in an activated state, and an ID of a GPU execution program in an activated state.

The model inference method based on a graphics rendering pipeline provided in this embodiment further includes:

obtaining the inference result by using the render thread, where the inference result is saved in a texture data format, and restoring the context state of the render thread, the texture ID, and the ID of the GPU execution program.

In this embodiment, by saving and restoring the context state of the render thread, the ID of the texture data currently in the activated state, and the ID of the GPU execution program currently in the activated state, the GPU rendering pipeline can normally render and display the inference result. In addition, by obtaining the inference result by using the render thread, the inference result sent by the GPU rendering pipeline by using the instruction stream can be received, or an address in which the GPU rendering pipeline saves the inference result can be read. A manner in which the render thread obtains the inference result is not limited in the embodiments of this application.

According to a second aspect, an embodiment of this application provides a model inference method based on a graphics rendering pipeline, including:

receiving texture data information transmitted by a central processing unit CPU, where the texture data information is obtained by the CPU from an instruction stream in a render thread, and the texture data information includes texture data; performing GPU model-based inference on the texture data in a graphics processing unit (GPU) rendering pipeline, to obtain an inference result of the texture data, where the GPU model is a model running in a GPU; and outputting the inference result to the render thread, where the inference result is in a texture data format.

The texture data information transmitted by the CPU is received, and GPU model-based inference is performed on the texture data in the graphics processing unit (GPU) rendering pipeline to obtain the inference result of the texture data. Compared with the conventional technology, because the GPU rendering pipeline is used to perform model inference on the texture data, instead of a Compute shader to implement inference on the texture data, conversion of the texture data into an SSBO data type is avoided, so that the Compute shader performs inference on the texture data. In addition, after GPU model-based inference is performed on the texture data in the GPU rendering pipeline, the inference result is converted into a texture data format, which avoids data type conversion of converting the inference result in which the data type is an SSBO into a texture type after the Compute shader completes inference in the conventional technology. Therefore, in this embodiment, not only model inference is implemented on the texture data, but also conversion of the texture data into another data type is avoided, thereby reducing I/O memory overheads.

Optionally, the performing GPU model-based inference on the texture data in a graphics processing unit (GPU) rendering pipeline includes:

sequentially executing a fragment shader of each layer by using the GPU rendering pipeline based on an input data position and an output data position of the fragment shader of each layer, where the fragment shader is a fragment shader corresponding to each layer in a layered structure generated by the CPU based on a layered structure of a training model and parameters of each layer in the render thread; or the fragment shader is a fragment shader corresponding to each layer in a merged layered structure generated by the CPU based on a merged layered structure of a training model and a merged parameter of each layer in the render thread.

In this embodiment, by sequentially executing the fragment shader of each layer by using the GPU rendering pipeline based on the input data position and the output data position of the fragment shader of each layer, inference is implemented on the texture data. In addition, the fragment shader is a fragment shader corresponding to each layer in a merged layered structure generated by the CPU based on a merged layered structure of a training model and a merged parameter of each layer in the render thread. By merging the layered structure of the training model and parameters of each layer in the current render thread, and determining the fragment shader corresponding to each layer in the merged layered structure based on the merged layered structure and the merged parameter of each layer, not only conversion from the training model in the current render thread to the GPU model is implemented, so that the GPU can execute the fragment shader, but also storage of intermediate node results is reduced, thereby further reducing I/O overheads.

The following describes a model inference apparatus, a device, a platform, a storage medium, and a computer program product provided in the embodiments. For content and effects thereof, refer to the model inference method provided in the first aspect and the optional manners of the first aspect of this application.

According to a third aspect, a model inference apparatus based on a graphics rendering pipeline is provided, including:

a first obtaining module, configured to obtain an instruction stream in a render thread; an extraction module, configured to extract and save texture data information from the instruction stream, where the texture data information includes texture data; and a sending module, configured to input the texture data information to a graphics processing unit (GPU) rendering pipeline, where the GPU rendering pipeline is used to perform GPU model-inference on the texture data to obtain an inference result of the texture data, and the GPU model is a model running in a GPU.

Optionally, the model inference apparatus based on a graphics rendering pipeline provided in this embodiment further includes:

a loading module, configured to load the GPU model to a memory.

Optionally, the loading module is further configured to:
obtain a layered structure of a training model and parameters of each layer in the render thread; generate, based on the layered structure and the parameters of each layer, a fragment shader corresponding to each layer in the layered structure; and load the fragment shader to the memory.

Optionally, the loading module is further configured to:
obtain a layered structure of a training model and parameters of each layer in the render thread; merge the layered structure and the parameters of each layer based on the layered structure to obtain a merged layered structure and a merged parameter of each layer; generate, based on the merged layered structure and the merged parameter of each layer, a fragment shader corresponding to each layer in the merged layered structure; and load the fragment shader to the memory.

Optionally, the loading module is further configured to:
determine a plurality of branch layers and a plurality of 1*1 convolution kernels in the layered structure; and merge the plurality of branch layers and multi-layer parameters corresponding to the plurality of branch layers, and/or merge the plurality of 1*1 convolution kernels and a plurality of parameters corresponding to the plurality of 1*1 convolution kernels.

Optionally, the texture data information further includes a texture ID of the texture data in a GPU memory, and the apparatus further includes:

a determining module, configured to determine an input data position and an output data position of the fragment shader of each layer based on the texture ID and the GPU model, where the GPU rendering pipeline is used to sequentially execute the fragment shader of each layer based on the input data position and the output data position of the fragment shader of each layer.

Optionally, the model inference apparatus based on a graphics rendering pipeline provided in this embodiment further includes:

a preprocessing module, configured to preprocess the texture data information; and a post-processing module, configured to post-process the inference result.

Optionally, the texture data information further includes a first save format of the texture data in the GPU memory and a first image size of the texture data, and the preprocessing module is further configured to:

convert the first image size into a second image size based on the GPU model; and convert the first save format into a second save format required by the GPU model.

The post-processing module is further configured to: convert the second image size of the texture data into the first image size, and convert the second save format of the texture data into the first save format.

Optionally, the model inference apparatus based on a graphics rendering pipeline provided in this embodiment further includes:

a second obtaining module, further configured to obtain and save a context state of the render thread, an ID of a texture in an activated state, and an ID of a GPU execution program in an activated state.

The model inference apparatus based on a graphics rendering pipeline provided in this embodiment further includes:

a second obtaining module, further configured to obtain the inference result by using the render thread, where the inference result is saved in a texture data format; and restore the context state of the render thread, the texture ID, and the ID of the GPU execution program.

According to a fourth aspect, an embodiment of this application provides a model inference apparatus based on a graphics rendering pipeline, including:

a receiving module, configured to receive texture data information transmitted by a central processing unit CPU, where the texture data information is obtained by the CPU from an instruction stream in a render thread, and the texture data information includes texture data; an inference module, configured to perform GPU model-based inference on the texture data in a graphics processing unit (GPU) rendering pipeline, to obtain an inference result of the texture data, where the GPU model is a model running in a GPU; and an output module, configured to output the inference result to the render thread, where the inference result is in a texture data format.

Optionally, the inference module is further configured to:

sequentially execute a fragment shader of each layer by using the GPU rendering pipeline based on an input data position and an output data position of the fragment shader of each layer, where the fragment shader is a fragment shader corresponding to each layer in a layered structure generated by the CPU based on a layered structure of a training model and parameters of each layer in the render thread, or the fragment shader is a fragment shader corresponding to each layer in a merged layered structure generated by the CPU based on a merged layered structure of a training model and a merged parameter of each layer in the render thread.

According to a fifth aspect, an embodiment of this application provides a device, including:

a processor and a memory, where the memory is configured to store computer executable instructions, so that the processor executes the instructions to implement the method according to the first aspect and the optional manners of the first aspect.

According to a sixth aspect, an embodiment of this application provides a device, including:

a processor and a memory, where the memory is configured to store computer executable instructions, so that the processor executes the instructions to implement the method according to the second aspect and the optional manners of the second aspect.

According to a seventh aspect, an embodiment of this application provides an inference platform based on a graphics rendering pipeline, including:

a render thread, a shader-based neural network inference ShaderNN module, and a cross-platform graphics program interface, where the ShaderNN module is configured to:

obtain an instruction stream in a render thread by using a central processing unit CPU; extract and save texture data information from the instruction stream, where the texture data information includes texture data; input the texture data information to a graphics processing unit (GPU) rendering pipeline, where the GPU rendering pipeline is used to perform GPU model-based inference on the texture data to obtain an inference result of the texture data, and the GPU model is a model running in a GPU; receive, by using the graphics processing unit (GPU), the texture data information transmitted by the central processing unit (CPU); perform GPU model-based inference on the texture data in the graphics processing unit (GPU) rendering pipeline, to obtain the inference result of the texture data, where the GPU model is a model running in the GPU; and output the inference result to the render thread through the cross-platform graphics program interface, where the inference result is in a texture data format.

According to an eighth aspect, an embodiment of this application provides a storage medium including computer instructions. When the instructions are executed by a computer, the computer is enabled to implement the method according to the first aspect and the optional manners of the first aspect.

According to a ninth aspect, an embodiment of this application provides a storage medium including computer instructions. When the instructions are executed by a computer, the computer is enabled to implement the method according to the second aspect and the optional manners of the second aspect.

According to a tenth aspect, an embodiment of this application provides a computer program product including instructions. When the computer program product is run on a computer or a processor, the computer or the processor is enabled to perform the method according to the first aspect or the optional manners of the first aspect.

According to an eleventh aspect, an embodiment of this application provides a computer program product including instructions. When the computer program product is run on a computer or a processor, the computer or the processor is enabled to perform the method according to the second aspect or the optional manners of the second aspect.

According to the model inference method and apparatus based on a graphics rendering pipeline, and the storage medium provided in this application, an instruction stream in a render thread is obtained; texture data information is extracted and saved from the instruction stream, where the texture data information includes texture data; and the texture data information is input to a graphics processing unit (GPU) rendering pipeline, where the GPU rendering pipeline is used to perform GPU model-based inference on the texture data to obtain an inference result of the texture data, and the GPU model is a model running in a GPU. Because the texture data information is obtained from the instruction stream in the current render thread, and the texture data is input to the GPU rendering pipeline, to implement rendering and display of an image, the GPU rendering pipeline in the embodiments of this application is used to perform GPU model-based inference on the texture data, to obtain the inference result of the texture data. Compared with the conventional technology, because the GPU rendering pipeline is used to perform model inference on the texture data, instead of a Compute shader to implement inference on the texture data, conversion of the texture data into an SSBO data type is avoided, so that the Compute shader performs inference on the texture data. In addition, after GPU model-based inference is performed on the texture data in the GPU rendering pipeline, the inference result is converted into a texture data format, which avoids data type conversion of converting the inference result in which the data type is an SSBO into a texture type after the Compute shader completes inference in the conventional technology. Therefore, in this embodiment, not only model inference is implemented on the texture data, but also conversion of the texture data into another data type is avoided, thereby reducing I/O memory overheads.

DESCRIPTION OF EMBODIMENTS

It should be understood that, although the terms first, second and the like may be used to describe image sizes and save formats in the embodiments of the present invention, these image sizes and save formats should not be limited to these terms. These terms are used only to distinguish the image sizes or the save formats from each other. For example, without departing from the scope of the embodiments of this application, a first image size may also be referred to as a second image size. Similarly, a second image size may also be referred to as a first image size. The expression of the save format is similar to that of the image size.

With continuous iteration of hardware devices of a mobile device, more mobile applications are integrated with an AI function, so that the mobile terminal is more intelligent and provides more natural and user-friendly services for users. In terms of images and videos, applications such as facial recognition, scene recognition, text recognition, and image super-resolution provide the mobile terminal with core functions such as secure unlocking, reading and retrieval, and video beautification. However, an AI function foundation depends on an inference platform of a neural network. As a result, on a hardware hashrate bearing, the AI function foundation also continuously evolves from a CPU and a GPU to a GPU. In the conventional technology, TensorFlow Lite is a common model inference framework for a mobile device. TensorFlow Lite is based on TensorFlow. A corresponding TensorFlow model can be converted into a model corresponding to TensorFlow Lite by using a corresponding converter. A GPU-based implementation of TensorFlow Lite is used as an example, A form of input data accessible to the GPU needs to be of an SSBO type because its inference computation on the GPU is implemented based on a Compute shader. However, for video stream data, when a video is displayed, data accessible to the GPU often exists in a data form of texture. Therefore, if TensorFlow Lite needs to be used to process the video stream data, data format conversion is inevitable. The conversion cannot be directly completed on the GPU side, and the CPU is required to control the conversion, which causes a large quantity of I/O memory overheads. To resolve the foregoing problem, the embodiments of this application provide a model inference method and apparatus based on a graphics rendering pipeline, and a storage medium for model inference based on a graphics rendering pipeline.

The following describes an example application scenario of the embodiments of this application.

Figure 1:
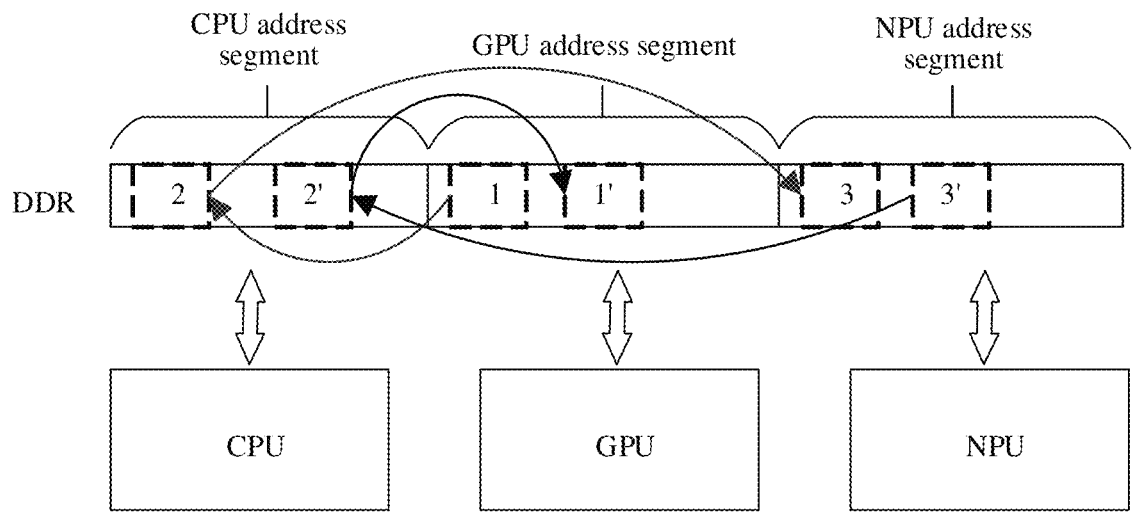
FIG. 1 is a schematic diagram of unified addressing in a non-limiting, exemplary ARM framework.
Figure 2:
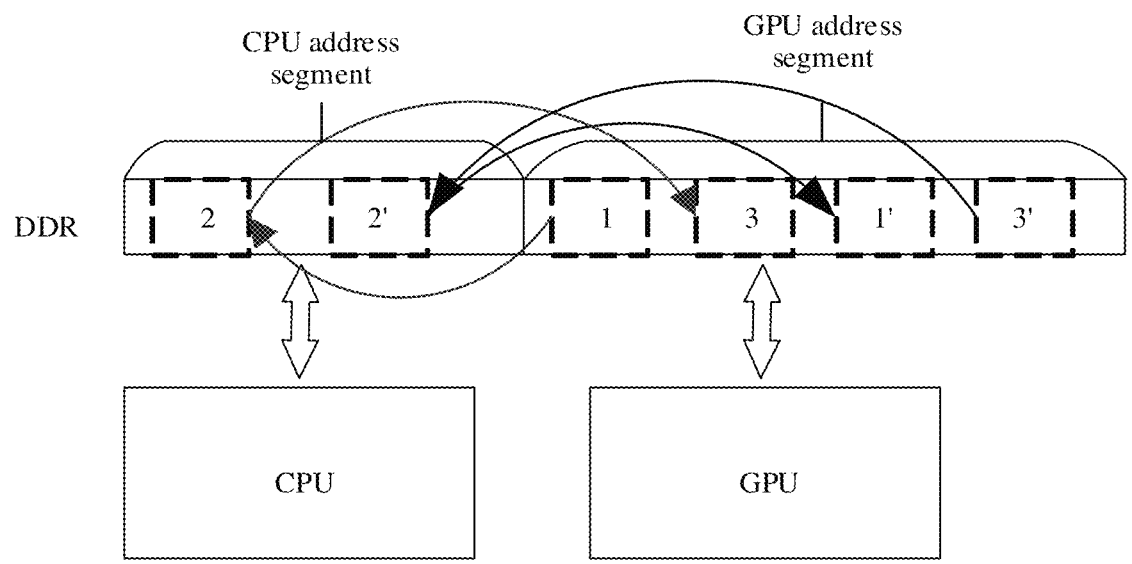
FIG. 2 is a schematic diagram of non-limiting, exemplary conversion between an SSBO data type and a texture data type.
Figure 3:
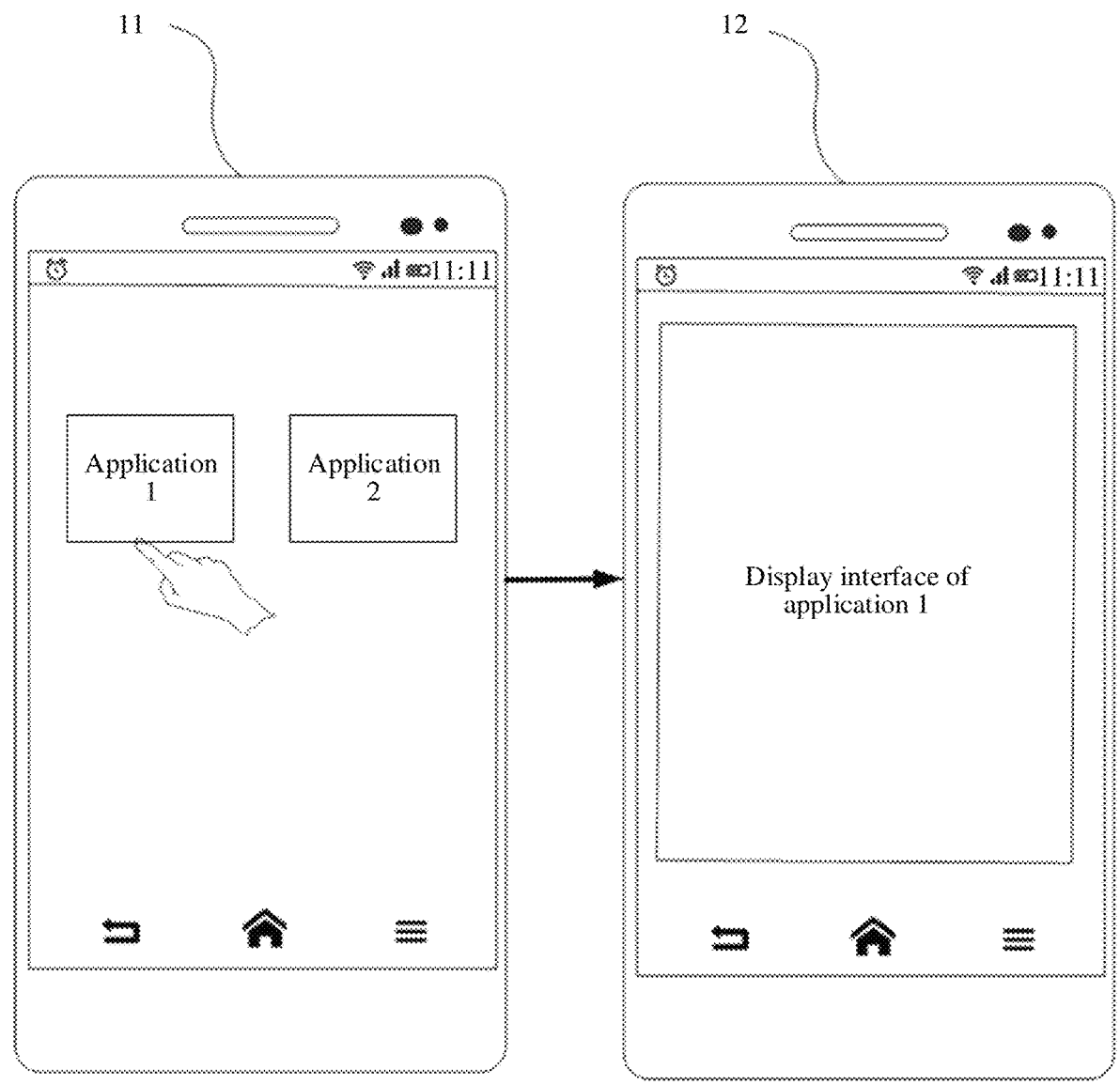
FIG. 3 is an example application scenario diagram according to an embodiment of this application.

In an application program in a terminal device, for example, an application program related to a game or video playback, video stream data may need to be processed to obtain a video effect wanted by a user. A specific type of the application program is not limited in the embodiments of this application, and a type of the terminal device is not limited either. The terminal device may be a smartphone, a personal computer, a tablet computer, a medical device, a game console, an in-vehicle terminal device, a self-driving device, a virtual reality device, an augmented reality device, a mixed reality device, or the like. For example, the terminal device is a smartphone. FIG. 3 is an example application scenario diagram according to an embodiment of this application. As shown in FIG. 3, an interface 11 of the smartphone shows that the smartphone includes at least an application 1 and an application 2. The application 1 and the application 2 may be configured to display an image or a video. An interface 12 is obtained by performing an operation on the application 1. The interface 12 is a display interface of the application 1, to display an image or a video in the application 1. In a process of displaying an image or a video, image data or video stream data needs to be rendered. Based on this, the embodiments of this application provide a model inference method and apparatus based on a graphics rendering pipeline, and a storage medium for model inference based on a graphics rendering pipeline.

Figure 4:
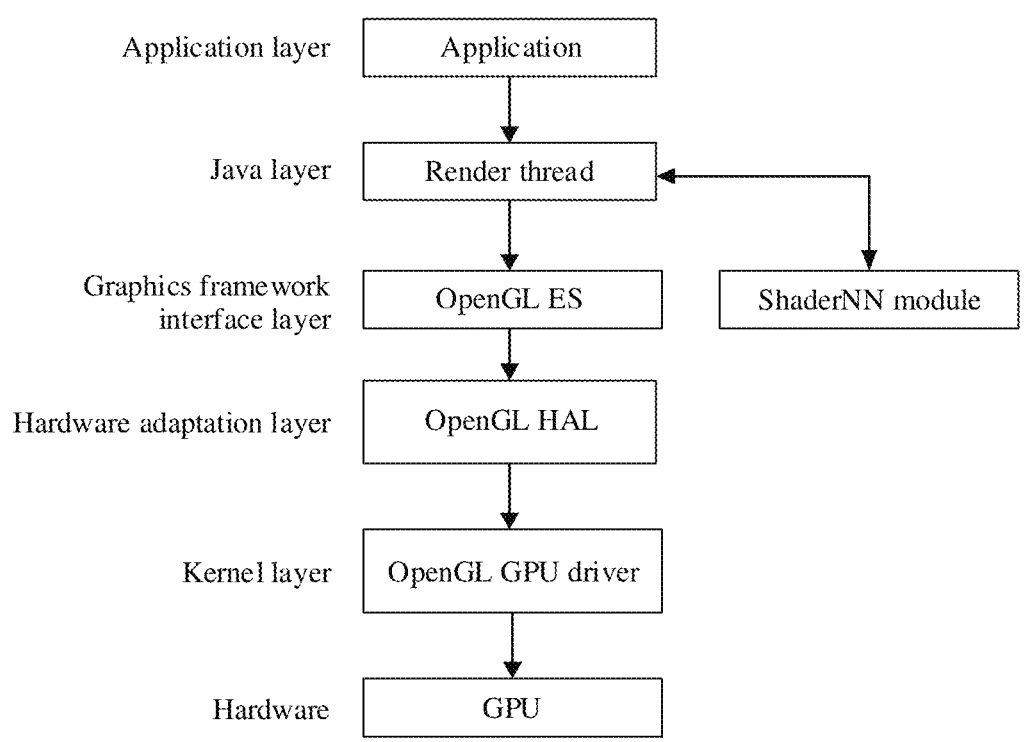
FIG. 4 is an example implementation form according to an embodiment of this application.

The embodiments of this application may be implemented in a graphics software system of the terminal device, and are program code deployed in the terminal device. FIG. 4 is an example implementation form of an embodiment of this application. As shown in FIG. 4, an application layer is used to implement logic of an application (APP). When displaying an image or a video, the APP renders and displays a to-be-displayed picture by using a render thread of a Java layer, invokes an application programming interface (API) of a cross-platform graphics program interface for embedded systems (Open Graphics Library for Embedded Systems, Open GL ES) system library in a graphics framework interface layer (Native) to a GPU-related interface of a hardware adaptation layer (HAL), interactively invokes a GPU driver by using a cross-platform graphics program interface (Open Graphics Library, OpenGL) of a kernel layer (Kernel), and finally implements execution of the GPU in hardware, to complete the rendering and display process of the image or the video on the terminal device. An entity for executing this embodiment may be a ShaderNN model integrated in the render thread. The ShaderNN model obtains an instruction stream to which the render thread is applied, obtains texture data information in the instruction stream as a model inference input, performs convolutional neural network inference in a GPU rendering pipeline, saves an inference result through texture information, and directly applies the inference result to the current rendering task to replace original content to complete rendering and display. Because the ShaderNN model directly obtains the texture data information from the instruction stream of the render thread, it is avoided in the conventional technology that texture data needs to be converted into SSBO type data in a CPU, convolutional neural network inference needs to be performed on the SSBO type data in a GPU, and then the inference result needs to be converted into a data type of texture data by using the CPU. Memory I/O overheads and synchronization costs between the CPU and the GPU caused by the data format conversion are further avoided, thereby improving overall model inference performance, indirectly improving an energy efficiency ratio, and implementing rational resource utilization.

Based on the foregoing application scenario, the embodiments of this application provide a model inference method and apparatus based on a graphics rendering pipeline, and a storage medium for model inference based on a graphics rendering pipeline.

Figure 5:
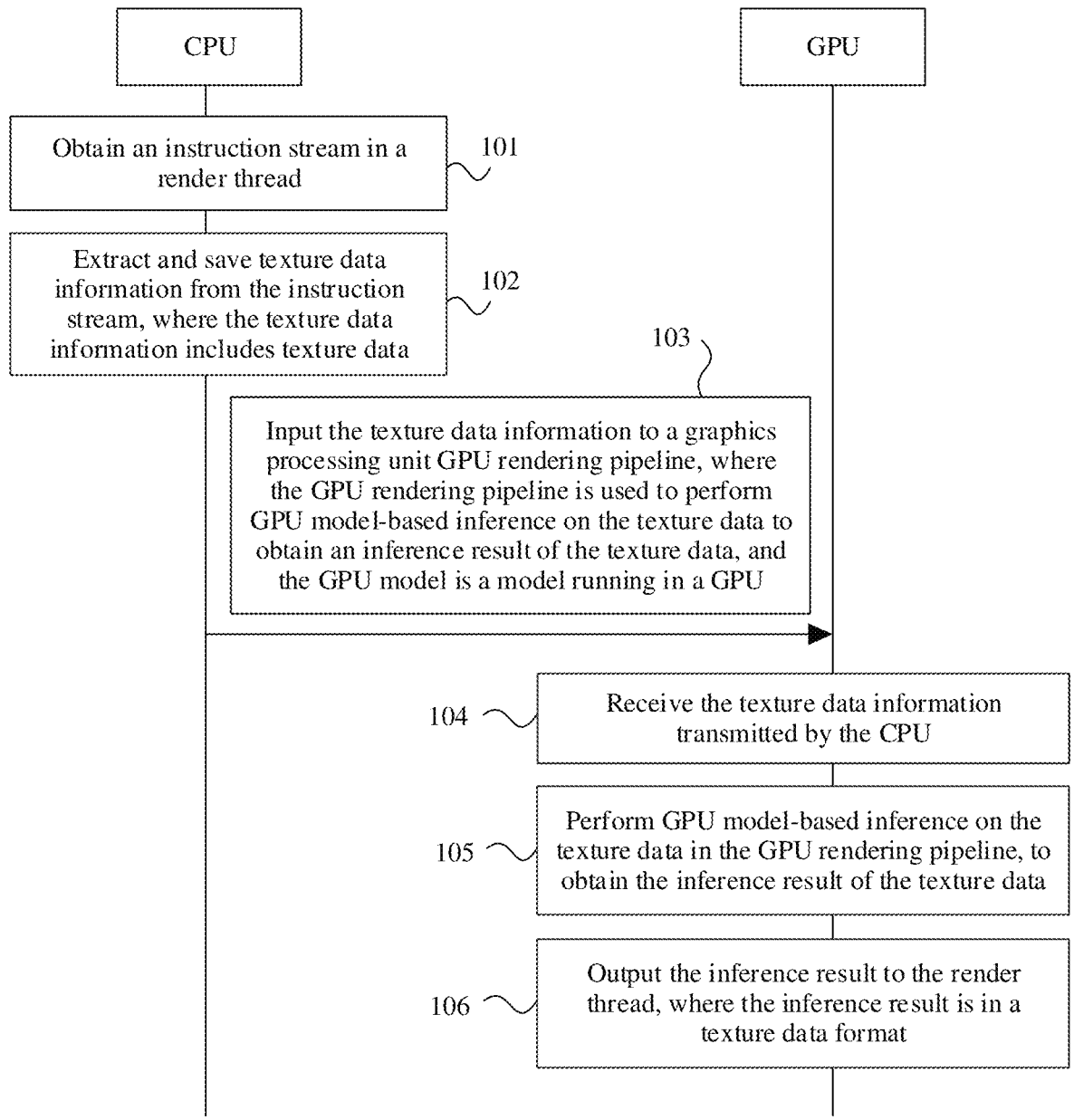
FIG. 5 is a schematic interaction flowchart of a model inference method based on a graphics rendering pipeline according to an embodiment of this application.

FIG. 5 is a schematic interaction flowchart of a model inference method based on a graphics rendering pipeline according to an embodiment of this application. The method may be performed by using a model inference apparatus based on a graphics rendering pipeline provided in the embodiments of this application. The model inference apparatus based on a graphics rendering pipeline may be a part or all of a terminal device. For example, the method may be implemented by using a CPU and a GPU in the terminal device. The model inference method based on a graphics rendering pipeline provided in the present disclosure is described below by using an example in which the terminal device is an entity for executing the method. As shown in FIG. 5, the model inference method based on a graphics rendering pipeline provided in this embodiment may include the following steps.

Step S101: A CPU obtains an instruction stream in a render thread.

A GPU rendering pipeline (GPU Pipeline) in an App usually includes fragment processing. The fragment processing is that each fragment corresponds to one invocation of a fragment shader, and is used to determine, before each fragment is stored in a frame buffer, texture of the fragment. The method provided in this embodiment may be applied to a fragment processing process in the GPU rendering pipeline.

Figure 6A:
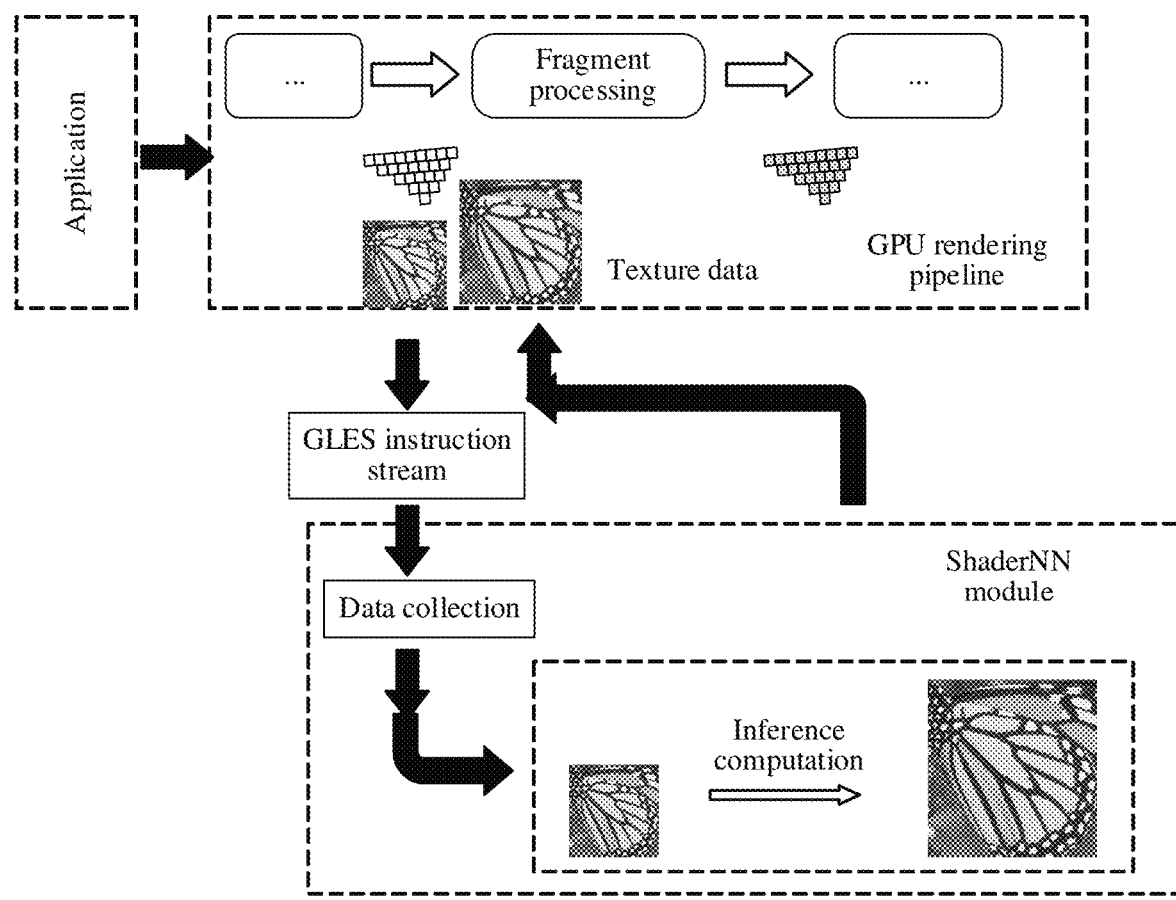
FIG. 6A to FIG. 6B are model inference framework diagrams according to an embodiment of this application.
Figure 6B:
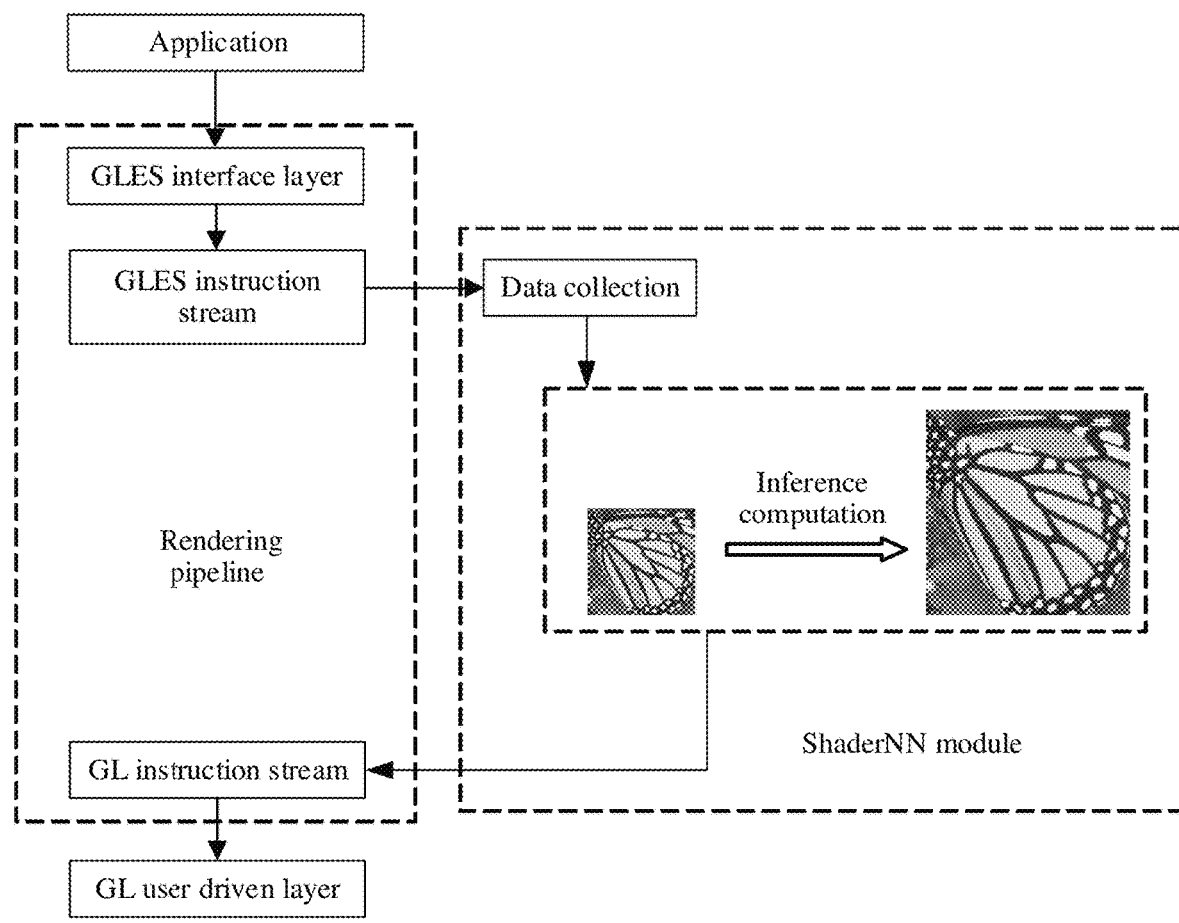

For ease of description of this embodiment, FIG. 6A to FIG. 6B are model inference framework diagrams according to an embodiment of this application. As shown in FIG. 6A, the model inference method based on a graphics rendering pipeline provided in this embodiment may be performed by using a ShaderNN module in the terminal device. The instruction stream and the texture data obtained from the render thread of the App are used to load a GPU model and run the GPU model, and the texture data computed after the model is run is updated to the GPU rendering pipeline for rendering and display.

The following describes content of step S101 in this embodiment. As shown in FIG. 6B, an application in the terminal device invokes a cross-platform graphics program interface for embedded devices (OpenGL for Embedded Systems, OpenGL ES) interface layer by using the render thread, to generate a graphics program interface for embedded devices (Graphics Library for Embedded Systems, GL ES) instruction stream; or an application in the terminal device invokes a cross-platform graphics program interface (Open Graphics Library, OPENGL) interface layer by using the render thread, to generate a graphics program interface (Graphics Library, GL) instruction stream. A type of the instruction stream is not limited in the embodiments of this application. The ShaderNN module obtains the instruction stream in the render thread. Specifically, the ShaderNN module may obtain the instruction stream in an instruction stream listening manner, for example, listens to an instruction stream related to content drawing at an OpenGL ES layer, where the instruction stream may include texture data information or other data information. A manner of obtaining an instruction stream, data in the obtained instruction stream, and the like are not limited in the embodiments of this application.

Step S102: The CPU extracts and saves texture data information from the instruction stream, where the texture data information includes texture data.

After the instruction stream in the current render thread is obtained, an instruction related to content preparation in the instruction stream needs to be preprocessed. Video content is used as an example. The instruction stream in the current render thread is obtained in an instruction stream listening manner. Data collection in FIG. 6A or FIG. 6B is used to obtain texture data information of a current frame from the instruction stream. The texture data information may be, for example, basic information of a video image. Specific information content of the texture data information is not limited in the embodiments of this application. In a possible implementation, the texture data information includes a texture ID of the texture data in a GPU memory, a first save format of the texture data in the GPU memory, and a first image size of the texture data.

The texture ID of the texture data in the GPU memory is usually used to identify different texture data, and data with different texture IDs represents different texture data. The first save format (texture format) of the texture data in the GPU memory may be, for example, a red-green-blue (RGB) format or a luminance-chrominance (Luminance (Y), blue-chrominance (U), red-chrominance (V), YUV) format. The RGB format is saved in a texture format. The YUV format may be saved by using two textures, namely, two channels: Y/UV channels, or three textures, namely, three channels: Y/U/V channels, respectively. A save format of the texture data is not limited in the embodiments of this application. The first image size of the texture data is used to indicate a resolution of the current video frame or image.

Step S103: The CPU inputs the texture data information to a graphics processing unit (GPU) rendering pipeline, where the GPU rendering pipeline is used to perform GPU model-based inference on the texture data to obtain an inference result of the texture data, and the GPU model is a model running in a GPU.

As shown in FIG. 6A or FIG. 6B, after the data collection, inference computation needs to be performed on the collected texture data. The GPU model is a convolutional neural network model running on the GPU, and the CPU inputs the texture data information to the graphics processing unit (GPU) rendering pipeline. A specific implementation of inputting the texture data information to the graphics processing unit (GPU) rendering pipeline is not limited in the embodiments of this application.

Step S104: The GPU receives the texture data information transmitted by the CPU.

A specific implementation in which the GPU receives the texture data information transmitted by the CPU is not limited in the embodiments of this application. The texture data information is obtained by the CPU from the instruction stream in the render thread, and the texture data information includes the texture data.

Step S105: The GPU performs GPU model-based inference on the texture data in the GPU rendering pipeline, to obtain the inference result of the texture data.

A manner in which the GPU performs GPU model-based inference on the texture data in the GPU rendering pipeline is not limited in the embodiments of this application. In a possible implementation, the texture data information further includes the texture ID of the texture data in the GPU memory, and before the CPU inputs the texture data information to a graphics processing unit (GPU) rendering pipeline, where the GPU rendering pipeline is used to perform GPU model-based inference on the texture data, the method further includes:

determining an input data position and an output data position of a fragment shader of each layer based on the texture ID and the GPU model, where the GPU rendering pipeline is used to sequentially execute the fragment shader of each layer based on the input data position and the output data position of the fragment shader of each layer.

The texture ID of the texture data in the GPU memory may include a plurality of IDs of the texture data in different phases. In an inference process, the texture data may be computed by a plurality of different fragment shaders. Therefore, the fragment shader of each layer needs to obtain input data of the fragment shader of the layer. After the fragment shader processes the input data, a processing result of the fragment shader needs to be output and saved to the output data position. Therefore, the input data position and the output data position of the fragment shader of each layer are determined based on the texture ID and the GPU model, and the fragment shader corresponding to each node in the GPU model may be separately bound to input data texture ID and output data texture ID of the fragment shader.

Based on the foregoing possible implementations, that the GPU performs GPU model-based inference on the texture data in the graphics processing unit (GPU) rendering pipeline includes:

sequentially executing the fragment shader of each layer by using the GPU rendering pipeline based on the input data position and the output data position of the fragment shader of each layer.

When executing the fragment shader, the GPU reads input data by using the input data texture ID of the fragment shader, and after completing computation of the fragment shader, writes a computation result into output data by using the output data texture ID. By using a plurality of IDs of the texture data in different phases in the GPU memory, the input data position information and the output data position information of the fragment shader corresponding to the phases are determined. Then, the fragment shader of each layer obtains input data at the input data position based on the input data position and the output data position corresponding to the fragment shader of each layer, calculates the input data by using the fragment shader, and outputs a computation result to the output data position. If output data of an upper-layer fragment shader is used as input data of a next-layer fragment shader, an output data position of the upper-layer fragment shader may be an input data position of the next-layer fragment shader. This is not limited in the embodiments of this application.

In a model inference process, a context state of the current render thread, an ID of a texture currently in an activated state, and an ID of a GPU execution program currently in an activated state change. To render and display the inference result, the current state of the render thread may be further saved. Optionally, before the CPU inputs the texture data information to a graphics processing unit (GPU) rendering pipeline, the method further includes:

The CPU obtains and saves a context state of the render thread, an ID of a texture in an activated state, and an ID of a GPU execution program in an activated state.

Figure 7:
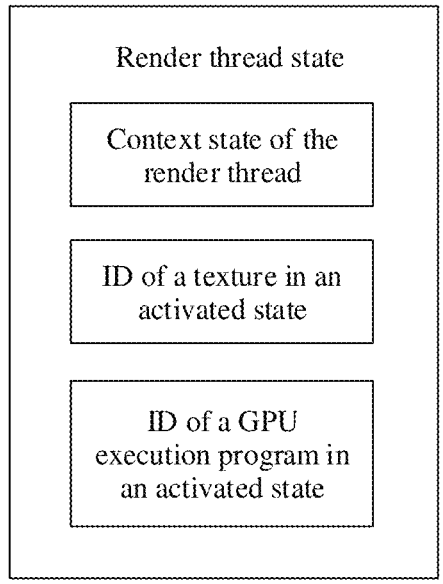
FIG. 7 is a schematic content diagram of saving of render thread states according to an embodiment of this application.

The context state of the render thread, the ID of the texture currently in the activated state, and the ID of the GPU execution program currently in the activated state may be obtained in the process of obtaining the instruction stream. A specific obtaining manner is not limited in the embodiments of this application. FIG. 7 is a schematic content diagram of saving of render thread states according to an embodiment of this application. As shown in FIG. 7, for saving of a render thread state, an EGL context, namely, the context state of the render thread in OpenGL ES rendering, may be obtained by using an OpenGL ES native platform graphics interface (EGL). The EGL context is a container for unified management of resources created by OpenGL ES. The ID of the texture in the activated state is obtained by using a graphics program interface, for rendering and drawing after the state is restored subsequently; and the ID of the GPU execution program in the activated state is obtained by using the graphics program interface, for rendering and drawing after the state is restored subsequently.

Step S106: The GPU outputs the inference result to the render thread, where the inference result is in a texture data format.

As shown in FIG. 6B, after inference computation is performed, the GPU may output the inference result to a GL instruction stream, and finally output the inference result to a GL user driven layer, to implement rendering of a video or an image based on the inference result. The inference result is saved in a texture data format, which avoids data format conversion and reduces I/O overheads. Then, the inference result is output to the render thread for subsequent rendering and display. In this embodiment, a ShaderNN module is inserted into the GPU pipeline to implement inference computation, and the inference result is directly applied to the current rendering task to replace original content to complete rendering and display. Inference computation and result presentation are completed at lower costs, which reduces power consumption and improves performance.

To ensure that the GPU pipeline can smoothly apply the inference result of the ShaderNN module to the current rendering pipeline to complete rendering and display, optionally, the model inference method based on a graphics rendering pipeline provided in this embodiment further includes:

The CPU obtains the inference result by using the render thread, saves the inference result in a texture data format, and restores the context state of the render thread, the texture ID, and the ID of the GPU execution program.

In a possible implementation, the inference result obtained by using the render thread may be actively obtained by using the CPU. For example, after implementing model inference and obtaining the inference result of the texture data, the GPU rendering pipeline saves the inference result of the texture data in a memory. The CPU obtains the inference result by reading the inference result of the texture data in the memory. In another possible implementation, the inference result obtained by using the render thread may be passively obtained by using the CPU. For example, after implementing model inference and obtaining the inference result of the texture data, the GPU rendering pipeline sends the inference result to the render thread in an instruction stream manner, so that the CPU obtains the inference result by using the instruction stream. By restoring the context state of the current render thread, the ID of the texture currently in the activated state, and the ID of the GPU execution program currently in the activated state, the current render thread is smooth, and smooth rendering and display of the inference result are ensured.

In this embodiment, the texture data information is obtained from the instruction stream in the current render thread, and the texture data information is input to the GPU rendering pipeline. The GPU rendering pipeline is used to perform GPU model-based inference on the texture data, to obtain the inference result of the texture data, to implement model inference on the texture data, and avoid conversion of the texture data into another data type, thereby reducing I/O memory overheads.

To ensure that GPU model-based inference is performed on the texture data in the GPU rendering pipeline after the texture data information is input to the GPU rendering pipeline, because a model file format of a training model in the current render thread may not be supported by the model inference apparatus provided in the embodiments of this application, a model file of the training model in the current render thread needs to be converted and loaded.

Figure 8:
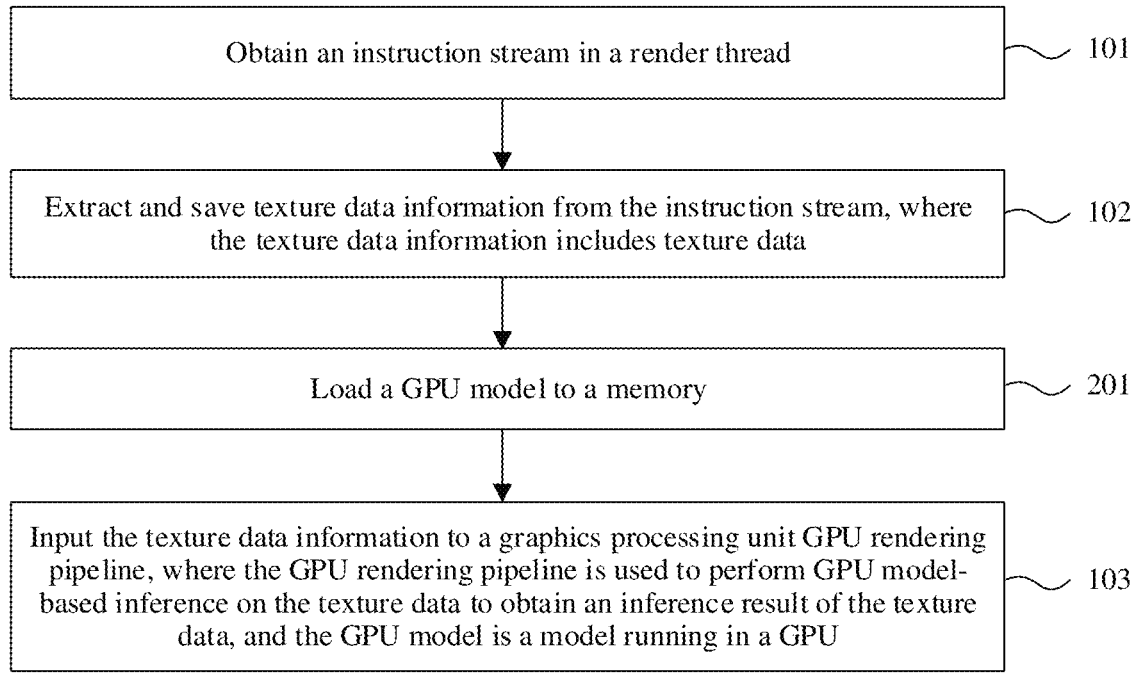
FIG. 8 is a schematic flowchart of a model inference method based on a graphics rendering pipeline according to another embodiment of this application.

Optionally, FIG. 8 is a schematic flowchart of a model inference method based on a graphics rendering pipeline according to another embodiment of this application. The method may be performed by using a model inference apparatus based on a graphics rendering pipeline provided in the embodiments of this application. The model inference apparatus based on a graphics rendering pipeline may be a part or all of a terminal device, for example, a CPU in the terminal device. The following describes the model inference method based on a graphics rendering pipeline provided in this embodiment by using an example in which the terminal device is an entity for executing the method. As shown in FIG. 8, before step S103, the model inference method based on a graphics rendering pipeline provided in this embodiment may further include the following steps.

Step S201: Load the GPU model to a memory.

If the GPU model has been loaded, the GPU model does not need to be reloaded; or if the GPU model has not been loaded, the GPU model needs to be loaded to the memory. By loading the GPU model to the memory, the GPU may read the GPU model from the memory, and then the GPU may perform GPU model-based inference on the texture data in the GPU rendering pipeline.

In a possible implementation, the loading the GPU model to a memory includes:

obtaining a layered structure of a training model and parameters of each layer in the render thread; generating, based on the layered structure and the parameters of each layer, a fragment shader corresponding to each layer in the layered structure; and loading the fragment shader to the memory.

In the possible implementation, the fragment shader executed by the GPU is a fragment shader corresponding to each layer in the layered structure generated by the CPU based on the layered structure of the training model and the parameters of each layer in the render thread.

Figure 9:
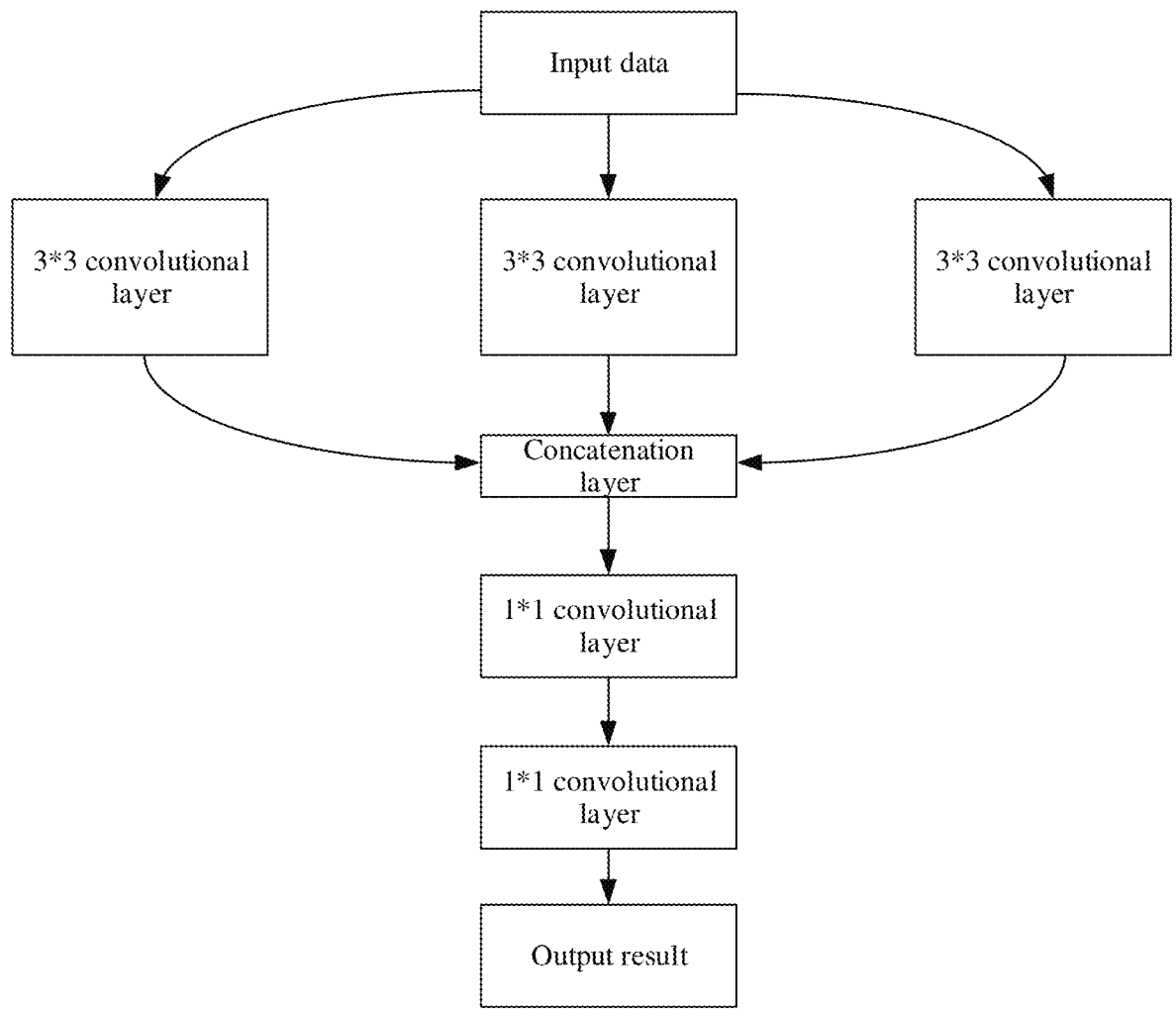
FIG. 9 is a schematic diagram of a layered structure of a training model according to an embodiment of this application.

The training model in the current render thread may be, for example, a Keras Model. A model file of the Keras Model is usually in an h5 format. A model file format of the Keras Model is converted into a file format supported by the model inference apparatus based on a graphics rendering pipeline provided in the embodiments of this application, for example, a GPU Model file by using a model converter tool. Then, the layered structure of the training model and the parameters of each layer in the current render thread are obtained. FIG. 9 is a schematic diagram of a layered structure of a training model according to an embodiment of this application. As shown in FIG. 9, after data is input, after passing through three 3*3 convolutional layer branches and then a concatenation layer (Concatenate), the data is computed by two 1*1 convolutional layers, to obtain an output result (output).

The layered structure may include a quantity of layers of the training model and dependency relationships between the layers, and the parameters of each layer are parameters such as a weight value, an activation function, a convolution kernel size, and a step size of the layered structure of each layer. Topological sorting is performed on relationships between the layers based on the layered structure, and the fragment shader corresponding to each layer is generated by collating the topological relationship of the layered structure and the parameters of each layer. In the layered structure shown in FIG. 9, the fragment shader corresponding to each layer may be generated. The fragment shader of each layer includes all convolution computation processes of the current layer. Finally, the fragment shader corresponding to each layer in the layered structure is loaded to the memory. Optionally, before the fragment shader corresponding to each layer in the layered structure is generated, the method further includes configuring a normalized range of input texture data and a normalized range of output data based on a requirement of the training model. This is not limited in the embodiments of this application.

In another possible implementation, the loading the GPU model to a memory includes:

obtaining a layered structure of a training model and parameters of each layer in the render thread; merging the layered structure and the parameters of each layer based on the layered structure to obtain a merged layered structure and a merged parameter of each layer; determining, based on the merged layered structure and the merged parameter of each layer, a fragment shader corresponding to each layer in the merged layered structure; and loading the fragment shader to the memory.

In the possible implementation, the fragment shader executed by the GPU is a fragment shader corresponding to each layer in the merged layered structure generated by the CPU based on the merged layered structure of the training model and the merged parameter of each layer in the render thread.

In this embodiment, the process of obtaining the layered structure of the training model and the parameters of each layer in the current render thread is similar to that in the foregoing embodiment. The layered structure is merged based on the layered structure to obtain the merged layered structure, and some layers may be merged based on a dependency relationship of the layered structure, thereby avoiding obtaining data of an upper-layer node for a plurality of times or avoiding saving an inference result of the upper-layer node, to reduce I/O overheads. In a possible implementation, the merging the layered structure based on the layered structures includes:

determining a plurality of branch layers and/or a plurality of 1*1 convolution kernels in the layered structure; and merging the plurality of branch layers and multi-layer parameters corresponding to the plurality of branch layers, and/or merging the plurality of 1*1 convolution kernels and a plurality of parameters corresponding to the plurality of 1*1 convolution kernels; or determining a plurality of branch layers in the layered structure, or determining a plurality of 1*1 convolution kernels in the layered structure, or determining a plurality of branch layers and a plurality of 1*1 convolution kernels in the layered structure, and then merging the plurality of branch layers, or merging a plurality of 1*1 convolution kernels, or merging a plurality of branch layers and a plurality of 1*1 convolution kernels. The upper part of the layered structure shown in FIG. 9 is a multi-branch structure. By optimizing the fragment shader, computation of the three branch layers is completed in the same fragment shader. Inputs of the three branches are data from a same input, and computation requirements of the three branch layers can be met through one read operation, so that each layer does not need to perform a read operation on the input data when each layer performs separate computation, thereby reducing I/O read operations on the input data. The lower part of the layered structure shown in FIG. 9 is one concatenation layer and two 1*1 convolutional layer operations. By optimizing the fragment shader, computation of the two 1*1 convolutional layers is completed in the same fragment shader. Therefore, a current computation result of an upper layer can be directly reused as an input of the 1*1 convolutional layer without saving a computation result of the upper layer first. A computation result of a previous layer is read when the 1*1 convolution layer is computed. Therefore, a write operation of the computation result of the upper layer and a read operation during the computation of the 1*1 convolution layer are also avoided. In this embodiment, by merging the plurality of branch layers in the layered structure, obtaining data of an upper-layer node for a plurality of times is avoided, and I/O overheads are reduced. By merging the plurality of 1*1 convolution kernels, storage of an inference result for the upper-layer node is avoided, and I/O overheads are further reduced.

After the layered structure is merged, the fragment shader corresponding to each layer in the merged layered structure is determined based on the merged layered structure and the parameters of each layer; and the fragment shader corresponding to each layer in the merged layered structure is loaded to the memory. This is similar to the content in the foregoing embodiment.

Figure 10:
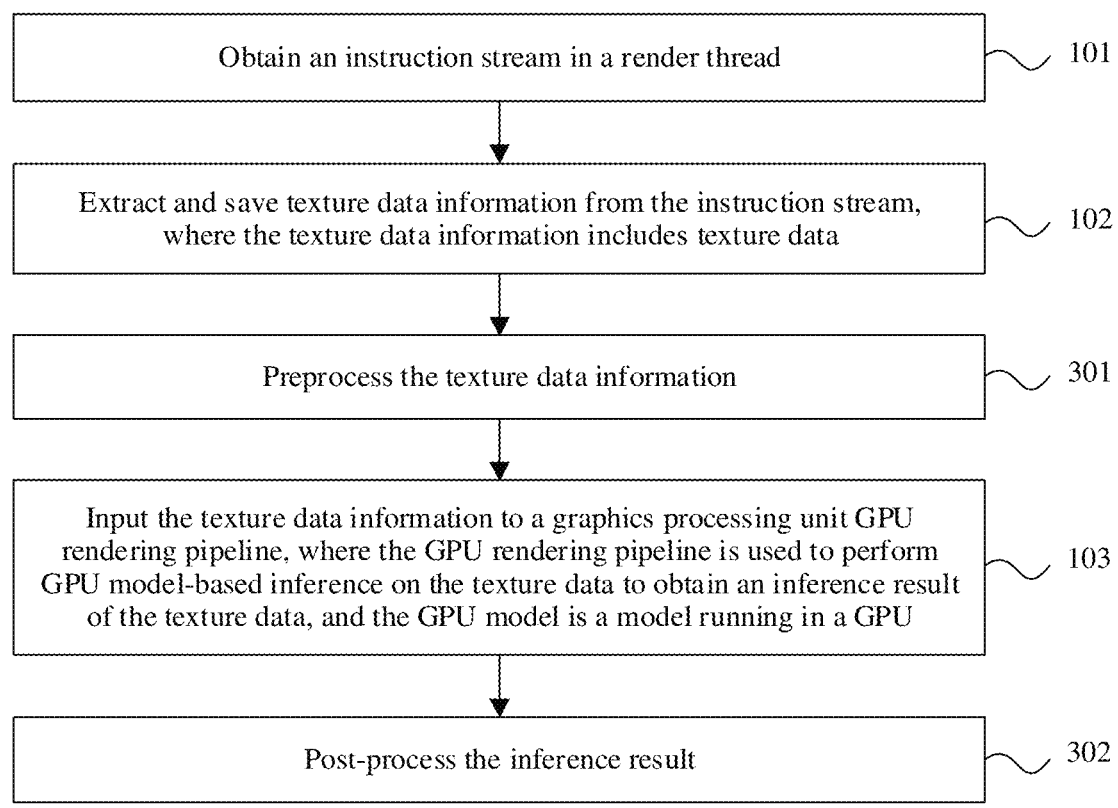
FIG. 10 is a schematic flowchart of a model inference method based on a graphics rendering pipeline according to still another embodiment of this application.

Because functions implemented by the GPU model are different, requirements for a save format or an image size of the texture data are also different. To implement GPU model-based inference on the texture data, optionally, FIG. 10 is a schematic flowchart of a model inference method based on a graphics rendering pipeline according to still another embodiment of this application. The method may be performed by using a model inference apparatus based on a graphics rendering pipeline provided in the embodiments of this application. The model inference apparatus based on a graphics rendering pipeline may be a part or all of a terminal device, for example, a CPU in the terminal device. The model inference method based on a graphics rendering pipeline provided in this embodiment is described below by using an example in which the terminal device is an execution body. As shown in FIG. 10, before step S103, namely, before the inputting the texture data information to a graphics processing unit (GPU) rendering pipeline, the model inference method based on a graphics rendering pipeline provided in this embodiment may further include the following steps.

Step S301: Preprocess the texture data information.

The texture data information may be preprocessed based on specific content included in the texture data information and a specific requirement of a neural network model for the texture data information. This is not limited in the embodiments of this application. In a possible implementation, the preprocessing the texture data information includes:

converting a first image size of the texture data into a second image size based on the GPU model; and converting a first save format of the texture data in the GPU memory into a second save format required by the GPU model.

The second image size of the texture data is an image size required when the GPU model processed the texture data, and the second save format of the texture data in the GPU memory is a save format required by the GPU model. For example, texture data whose first save format is an RGB format is preprocessed to extract data of a Y channel A Y/UV format is used as the second save format to simplify input data content of model inference computation. This is not limited in the embodiments of this application.

After step S103, the method further includes:

Step S302: Post-process the inference result.

The post-processing for the inference result corresponds to the preprocessing for data information, and is used to restore the inference result to the format, size, and the like of the texture data information. In a possible implementation, the post-processing the inference result includes:

converting the second image size of the texture data into the first image size, and converting the second save format of the texture data into the first save format.

The following describes an apparatus, a device, a storage medium, and a computer program product provided in the embodiments of this application. For content and effects thereof, refer to the model inference method based on a graphics rendering pipeline provided in the foregoing embodiments of this application.

Figure 11:
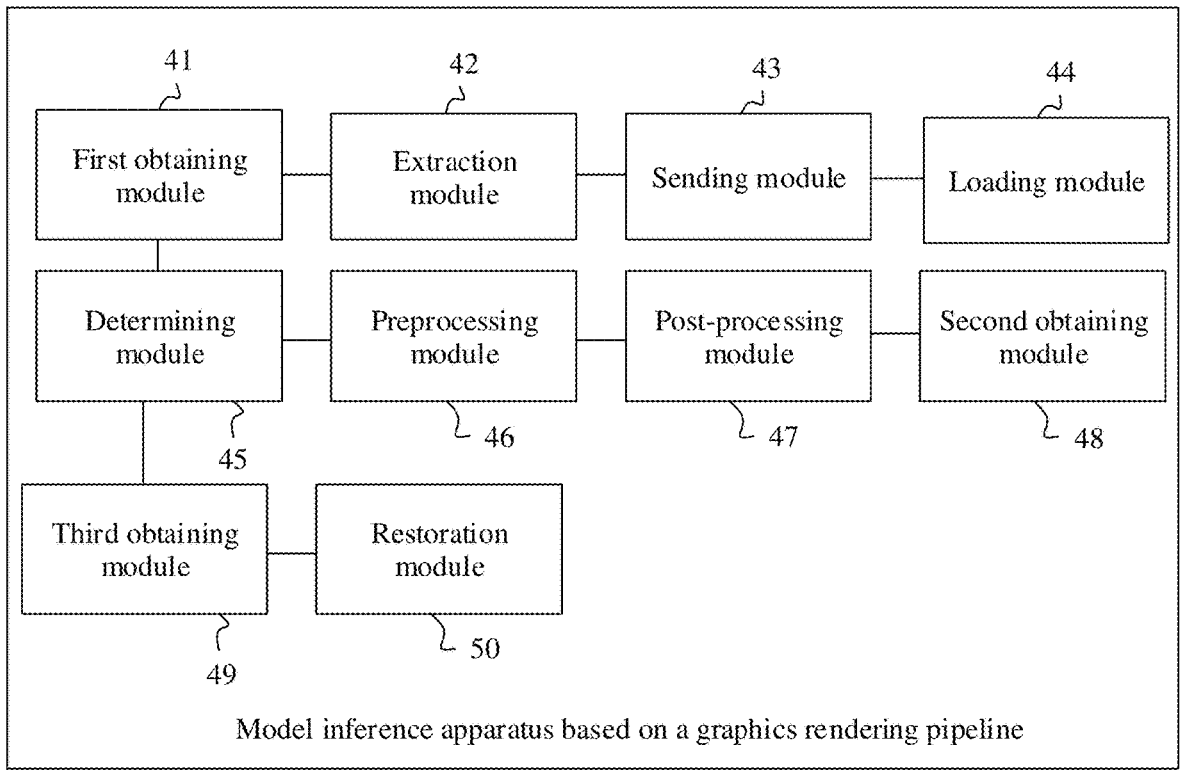
FIG. 11 is a schematic structural diagram of a model inference apparatus based on a graphics rendering pipeline according to an embodiment of this application.

An embodiment of this application provides a model inference apparatus based on a graphics rendering pipeline. FIG. 11 is a schematic structural diagram of a model inference apparatus based on a graphics rendering pipeline according to an embodiment of this application. The model inference apparatus based on a graphics rendering pipeline may be a part or all of a terminal device, for example, a CPU in the terminal device. As shown in FIG. 11, the model inference apparatus based on a graphics rendering pipeline provided in this embodiment may include:

a first obtaining module 41, configured to obtain an instruction stream in a render thread;

an extraction module 42, configured to extract and save texture data information from the instruction stream, where the texture data information includes texture data; and a sending module 43, configured to input the texture data information to a graphics processing unit (GPU) rendering pipeline, where the GPU rendering pipeline is used to perform GPU model-based inference on the texture data to obtain an inference result of the texture data, and the GPU model is a model running in a GPU.

In an optional case, the function of the extraction module may alternatively be completed by a processing module. The processing module may be, for example, a processor. The first obtaining module and the sending module may be transmission interfaces of the processor, or the first obtaining module may be a receiving interface of the processor, and the sending module is a sending interface of the processor. In this case, the function of the extraction module may alternatively be completed by the processor.

Optionally, as shown in FIG. 11, the model inference apparatus based on a graphics rendering pipeline provided in this embodiment may further include:

a loading module 44, configured to load the GPU model to a memory.

Optionally, the loading module 44 is further configured to:
obtain a layered structure of a training model and parameters of each layer in the render thread; generate, based on the layered structure and the parameters of each layer, a fragment shader corresponding to each layer in the layered structure; and load the fragment shader to the memory.

Optionally, the loading module 44 is further configured to:
obtain a layered structure of a training model and parameters of each layer in the render thread; merge the layered structure and the parameters of each layer based on the layered structure to obtain a merged layered structure and a merged parameter of each layer; generate, based on the merged layered structure and the merged parameter of each layer, a fragment shader corresponding to each layer in the merged layered structure; and load the fragment shader to the memory.

Optionally, the loading module 44 is further configured to:
determine a plurality of branch layers and a plurality of 1*1 convolution kernels in the layered structure; and merge the plurality of branch layers and multi-layer parameters corresponding to the plurality of branch layers, and/or merge the plurality of 1*1 convolution kernels and a plurality of parameters corresponding to the plurality of 1*1 convolution kernels.

In an optional case, the function of the loading module may be completed by a processing module, and the processing module may be, for example, a processor.

Optionally, the texture data information further includes a texture ID of the texture data in a GPU memory. As shown in FIG. 11, the model inference apparatus based on a graphics rendering pipeline provided in this embodiment may further include:

a determining module 45, configured to determine an input data position and an output data position of the fragment shader of each layer based on the texture ID and the GPU model, where the GPU rendering pipeline is used to sequentially execute fragment shader of each layer based on the input data position and the output data position of the fragment shader of each layer.

Optionally, the model inference apparatus based on a graphics rendering pipeline provided in this embodiment further includes:

a preprocessing module 46, configured to preprocess the texture data information; and a post-processing module 47, configured to post-process the inference result.

Optionally, the texture data information further includes a first save format of the texture data in the GPU memory and a first image size of the texture data, and the preprocessing module 46 is further configured to:

convert the first image size into a second image size based on the GPU model; and convert the first save format into a second save format required by the GPU model.

The post-processing module 47 is further configured to:
convert the second image size of the texture data into the first image size, and convert the second save format of the texture data into the first save format.

Optionally, the model inference apparatus based on a graphics rendering pipeline provided in this embodiment further includes:

a second obtaining module 48, further configured to obtain and save a context state of the render thread, an ID of a texture in an activated state, and an ID of a GPU execution program in an activated state;

a third obtaining module 49, further configured to obtain the inference result by using the render thread, where the inference result is saved in a texture data format; and a restoration module 50, configured to restore the context state of the render thread, the texture ID, and the ID of the GPU execution program.

In an optional case, both the second obtaining module and the third obtaining module may be transmission interfaces or receiving interfaces of the processor, the functions of the determining module, the preprocessing module, the post-processing module, and the restoration module may all be implemented by a processing module. The processing module may be, for example, a processor. In this case, the functions of the determining module, the preprocessing module, the post-processing module, and the restoration module may all be completed by the processor.

The apparatus embodiment provided in this application is merely an example. The module division in FIG. 11 is merely logical function division. In an actual implementation, another division manner may be used. For example, a plurality of modules may be combined or may be integrated into another system. Coupling between the modules may be implemented by using some interfaces. These interfaces are usually electrical communications interfaces, but it is not excluded that these interfaces may be mechanical interfaces or interfaces in other forms. Therefore, the modules described as separate components may or may not be physically separated, may be located in one place, or may be distributed in different positions of a same device or different devices.

Figure 12:
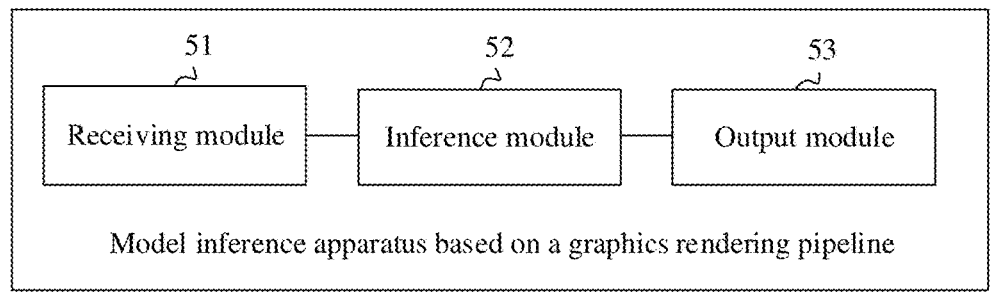
FIG. 12 is a schematic structural diagram of a model inference apparatus based on a graphics rendering pipeline according to an embodiment of this application.

An embodiment of this application provides a model inference apparatus based on a graphics rendering pipeline. FIG. 12 is a schematic structural diagram of a model inference apparatus based on a graphics rendering pipeline according to an embodiment of this application. The model inference apparatus based on a graphics rendering pipeline may be a part or all of a terminal device, for example, a GPU in the terminal device. The following uses an example in which the terminal device is an entity for executing the method. As shown in FIG. 12, the model inference apparatus based on a graphics rendering pipeline provided in this embodiment may include:

a receiving module 51, configured to receive texture data information transmitted by a central processing unit CPU, where the texture data information is obtained by the CPU from an instruction stream in a render thread, and the texture data information includes texture data;

an inference module 52, configured to perform GPU model-based inference on the texture data in a graphics processing unit (GPU) rendering pipeline, to obtain an inference result of the texture data, where the GPU model is a model running in a GPU; and an output module 53, configured to output the inference result to the render thread, where the inference result is in a texture data format.

Optionally, the inference module 52 is further configured to:

sequentially execute a fragment shader of each layer by using the GPU rendering pipeline based on an input data position and an output data position of the fragment shader of each layer, where the fragment shader is a fragment shader corresponding to each layer in a layered structure generated by the CPU based on a layered structure of a training model and parameters of each layer in the render thread, or the fragment shader is a fragment shader corresponding to each layer in a merged layered structure generated by the CPU based on a merged layered structure of a training model and a merged parameter of each layer in the render thread.

In an optional case, both the receiving module and the output module may be transmission interfaces of the processor, and the inference module may be completed by a processing module. The processing module may be, for example, a processor. In this case, the function of the inference module may be completed by the processor.

Figure 13:
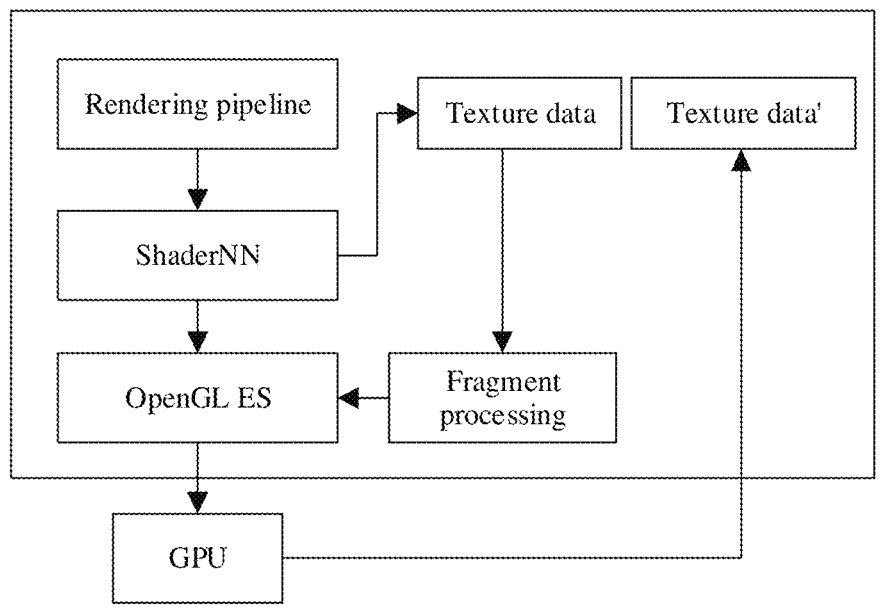
FIG. 13 is a schematic structural diagram of an inference platform based on a graphics rendering pipeline according to an embodiment of this application.

An embodiment of this application provides an inference platform based on a graphics rendering pipeline. FIG. 13 is a schematic structural diagram of an inference platform based on a graphics rendering pipeline according to an embodiment of this application. As shown in FIG. 13, the inference platform includes:

a render thread, a ShaderNN module, and a graphics program interface. The graphics program interface may be a cross-platform graphics program interface for embedded systems OPENGL ES, or may be a cross-platform graphics program interface OPENGL. This is not limited in the embodiments of this application. In FIG. 13, a cross-platform graphics program interface for embedded systems OPENGL ES is used as an example. The ShaderNN module is configured to obtain an instruction stream in a render thread by using a central processing unit CPU; extract and save texture data information from the instruction stream, where the texture data information includes texture data; input the texture data information to a graphics processing unit (GPU) rendering pipeline, where the GPU rendering pipeline is used to perform GPU model-based inference on the texture data to obtain an inference result of the texture data, and the GPU model is a model running in a GPU; receive, by using the graphics processing unit (GPU), the texture data information transmitted by the central processing unit (CPU); perform GPU model-based inference on the texture data in the graphics processing unit (GPU) rendering pipeline, to obtain the inference result of the texture data, where the GPU model is a model running in the GPU; and output the inference result to the render thread through the cross-platform graphics program interface, where the inference result is in a texture data format.

Figure 14:
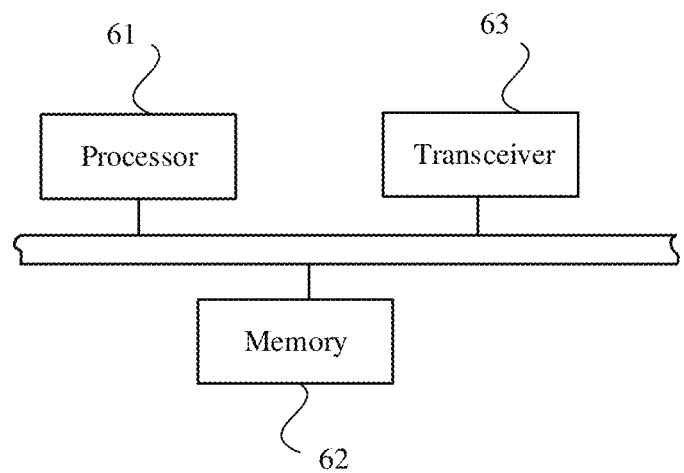
FIG. 14 is a schematic structural diagram of a terminal device according to an embodiment of this application.

An embodiment of this application provides a device. FIG. 14 is a schematic structural diagram of a terminal device according to an embodiment of this application. As shown in FIG. 14, the terminal device provided in this application includes a processor 61, a memory 62, and a transceiver 63. The memory stores one or more software instructions or a computer program. The processor may be a chip. The transceiver 63 implements sending and receiving of communication data by the terminal device. The processor 61 is configured to invoke the one or more software instructions in the memory to implement the foregoing model inference method based on a graphics rendering pipeline. For content and effects thereof, refer to the method embodiments.

Figure 15:
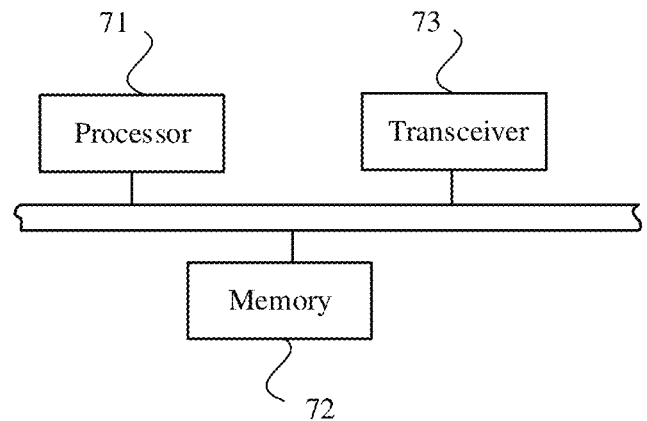
FIG. 15 is a schematic structural diagram of a device according to an embodiment of this application.

An embodiment of this application provides a device. FIG. 15 is a schematic structural diagram of a device according to an embodiment of this application. As shown in FIG. 15, the terminal device provided in this application includes a processor 71, a memory 72, and a transceiver 73. The memory stores one or more software instructions or a computer program. The processor may be a chip. The transceiver 73 implements sending and receiving of communication data by the terminal device. The processor 71 is configured to invoke the one or more software instructions in the memory to implement the foregoing model inference method based on a graphics rendering pipeline. For content and effects thereof, refer to the method embodiments.

Figure 16:
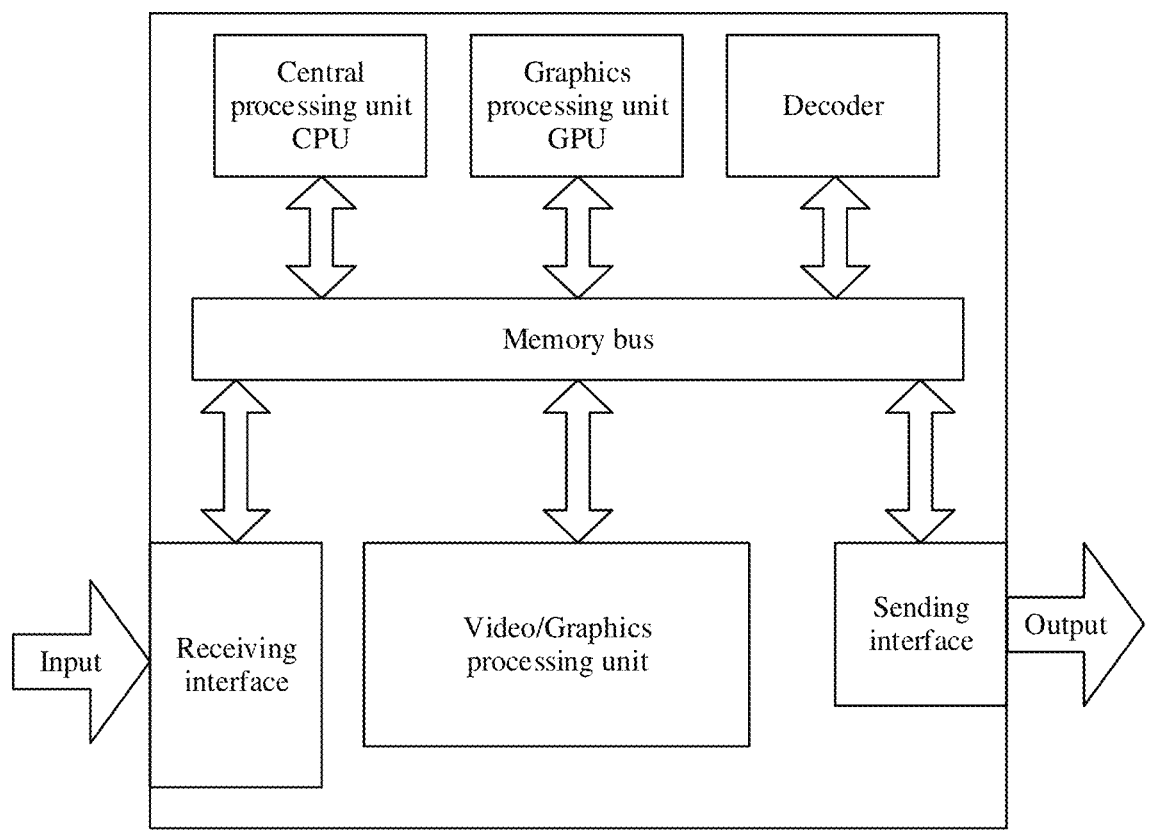
FIG. 16 is a schematic diagram of an example hardware architecture of a model inference apparatus based on a graphics rendering pipeline according to an embodiment of this application.

FIG. 16 is a schematic diagram of an example hardware architecture of a model inference apparatus based on a graphics rendering pipeline according to an embodiment of this application. As shown in FIG. 16, a hardware architecture of a model inference apparatus 900 based on a graphics rendering pipeline is applicable to an SOC and an application processor (application processor, AP).

For example, the model inference apparatus 900 based on a graphics rendering pipeline includes at least one central processing unit (CPU), at least one memory, a graphics processing unit (GPU), a decoder, a receiving interface, a sending interface, and the like. Optionally, the model inference apparatus 900 based on a graphics rendering pipeline may further include a microprocessor unit, a microcontroller unit MCU, and the like. In an optional case, the foregoing parts of the model inference apparatus 900 based on a graphics rendering pipeline are coupled by using connectors. It should be understood that in the embodiments of this application, the coupling refers to mutual connection in a specific manner, including direct connection or indirect connection by using other devices, for example, connection by using various interfaces, transmission lines, or buses. These interfaces are usually electrical communications interfaces, but it is not excluded that these interfaces may be mechanical interfaces or interfaces in other forms. This is not limited in the embodiments of the present disclosure. In an optional case, the foregoing parts are integrated on a same chip. In another optional case, the CPU, the GPU, the decoder, the receiving interface, and the sending interface are integrated on one chip, and parts inside the chip access an external memory by using a bus. A dedicated video/graphics processing unit may be integrated on a same chip with the CPU, or may exist as an independent processor chip. For example, the dedicated video/graphics processing unit may be a dedicated image signal processor (ISP). The chip in this embodiment is a system manufactured on a same semiconductor substrate by using an integrated circuit process, and is also referred to as a semiconductor chip. The chip may be a set of integrated circuits formed on a substrate (usually a semiconductor material such as silicon) manufactured by using the integrated circuit process. An outer layer of the chip is usually encapsulated by a semiconductor encapsulation material. The integrated circuit may include various types of functional components, and each type of functional component includes a transistor such as a logic gate circuit, a metal-oxide-semiconductor (MOS) transistor, a bipolar transistor, or a diode, or may include another component such as a capacitor, a resistor, or an inductor. Each functional component may work independently or work under the action of necessary driver software, and may implement various functions such as communication, operation, or storage.

Optionally, the CPU may be a single-core (single-CPU) processor or a multi-core (multi-CPU) processor. Optionally, the CPU may be a processor set including a plurality of processors, and the plurality of processors are coupled to each other by using one or more buses. In an optional case, some processing of an image signal or a video signal is completed by the GPU, and some processing of the image signal or the video signal is completed by the dedicated video/graphics processing unit, or may be completed by software code running on a general-purpose CPU or GPU.

The apparatus may further include a memory, which may be configured to store computer program instructions, and various types of computer program code including an operating system (OS), various user application programs, and program code used to execute the solutions of this application. The memory may be further configured to store video data, image data, and the like. The CPU may be configured to execute the computer program code stored in the memory, to implement the method in the embodiments of this application. Optionally, the memory may be a non-power-off volatile memory, for example, an embedded multimedia card (Embedded Multi Media Card, eMMC), a universal flash storage (UFS) or a read-only memory (ROM), or another type of static storage device that can store static information and instructions, or may be a power-off volatile memory, for example, a random access memory (RAM) or another type of dynamic storage device that can store information and instructions, or may be an electrically erasable programmable read-only memory (EEPROM), a compact disc read-only memory (CD-ROM) or another optical disk storage, or an optical disc storage (including compact discs, laser discs, optical discs, digital versatile discs, Blu-ray discs, and the like), a magnetic storage medium or another magnetic storage device, or any other computer readable storage medium that can be used to carry or store program code in a form of an instruction or a data structure and that can be accessed by a computer, but is not limited thereto.

The receiving interface may be a data input interface of the processor chip. In an optional case, the receiving interface may be a mobile industry processor interface (MIPI), a high definition multimedia interface (HDMI), a Display Port (DP), or the like.

Figure 17:
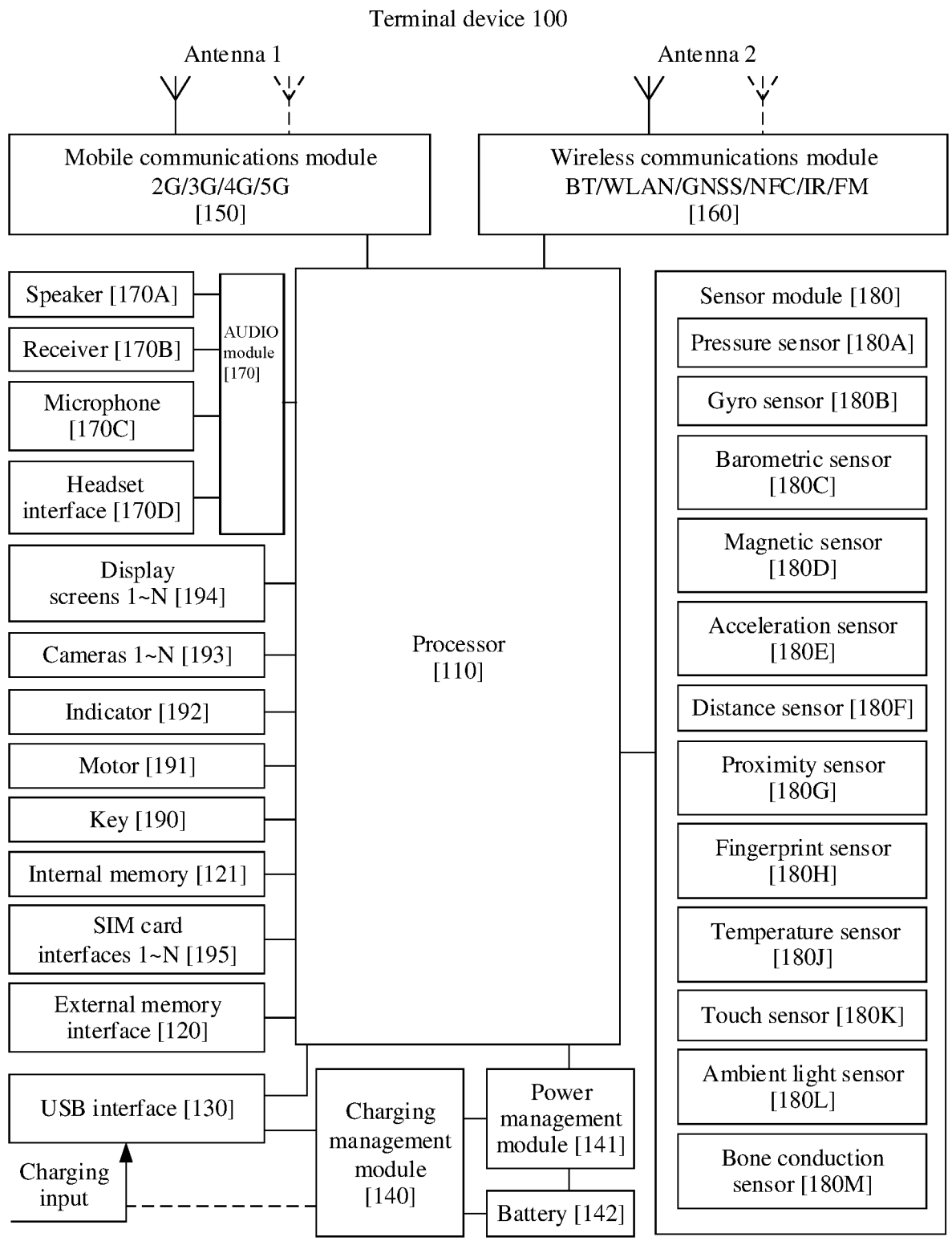
FIG. 17 is a schematic structural diagram of a terminal device according to still another embodiment of this application.

For example, FIG. 17 is a schematic structural diagram of a terminal device according to still another embodiment of this application. As shown in FIG. 17, the terminal device 100 may include a processor 110, an external memory interface 120, an internal memory 121, a universal serial bus (USB) interface 130, a charging management module 140, a power management module 141, a battery 142, an antenna 1, an antenna 2, a mobile communications module 150, a wireless communications module 160, an audio module 170, a speaker 170A, a receiver 170B, a microphone 170C, a headset interface 170D, a sensor 180, a key 190, a motor 191, an indicator 192, a camera 193, a display screen 194, a subscriber identification module (SIM) card interface 195, and the like. It may be understood that the structure shown in this embodiment does not constitute a specific limitation on the terminal device 100. In some other embodiments of this application, the terminal device 100 may include more or fewer components than those shown in the figure, or combine some components, or split some components, or have different component arrangements. The components shown in the figure may be implemented by hardware, software, or a combination of software and hardware.

The processor 110 may include one or more processing units. For example, the processor 110 may include an AP, a modem processor, a GPU, an ISP, a controller, a video codec, a digital signal processor (DSP), a baseband processor, and/or a neural-network processing unit (NPU), or the like. Different processing units may be independent components, or may be integrated into one or more processors. In some embodiments, the terminal device 100 may alternatively include one or more processors 110. The controller may be a nerve center and a command center of the terminal device 100. The controller may generate an operation control signal based on instruction operation code and a timing signal, to control instruction fetching and instruction execution. A memory may be further disposed in the processor 110, to store instructions and data. In some embodiments, the memory in the processor 110 is a cache memory. The memory may save one or more instructions or data that has just been used or recycled by the processor 110. If the processor 110 needs to use the one or more instructions or data again, the instructions or data may be invoked directly from the memory. This avoids repeated access and reduces a waiting time of the processor 110, thereby improving system efficiency of the terminal device 100.

In some embodiments, the processor 110 may include one or more interfaces. The interfaces may include an inter-integrated circuit (I2C) interface, an inter-integrated circuit sound (I2S) interface, a pulse code modulation (PCM) interface, a universal asynchronous receiver/transmitter (UART) interface, an MIPI, a general-purpose input/output (GPI/O) interface, a subscriber identity module (SIM) interface, and/or a USB interface, an HDMI, a V-By-One interface, a DP, and the like, where the V-By-One interface is a digital interface standard developed for image transmission. The USB interface 130 is an interface that complies with a USB standard specification, and may be specifically a Mini USB interface, a Micro USB interface, a USB Type C interface, or the like. The USB interface 130 may be used to connect to a charger to charge the terminal device 100, or may be used to transmit data between the terminal device 100 and a peripheral device, or may be used to connect to a headset and play audio through the headset.

It may be understood that the interface connection relationships between the modules shown in this embodiment are merely an example description, and does not constitute a structural limitation on the terminal device 100. In some other embodiments of this application, the terminal device 100 may alternatively use different interface connection manners in the foregoing embodiments or a combination of a plurality of interface connection manners.

The charging management module 140 is configured to receive a charging input from a charger. The charger may be a wireless charger or a wired charger. In some wired charging embodiments, the charging management module 140 may receive a charging input of a wired charger through the USB interface 130. In some wireless charging embodiments, the charging management module 140 may receive a wireless charging input through a wireless charging coil of the terminal device 100. While charging the battery 142, the charging management module 140 may further supply power to the terminal device 100 by using the power management module 141.

The power management module 141 is configured to connect the battery 142, the charging management module 140, and the processor 110. The power management module 141 receives an input from the battery 142 and/or the charging management module 140, and supplies power to the processor 110, the internal memory 121, the display screen 194, the camera 193, the wireless communications module 160, and the like. The power management module 141 may be further configured to monitor parameters such as a battery capacity, a quantity of battery cycles, and a battery health status (leakage and impedance). In some other embodiments, the power management module 141 may alternatively be disposed in the processor 110. In some other embodiments, the power management module 141 and the charging management module 140 may alternatively be disposed in a same component.

A wireless communication function of the terminal device 100 may be implemented by using the antenna 1, the antenna 2, the mobile communications module 150, the wireless communications module 160, the modem processor, the baseband processor, and the like. The antenna 1 and the antenna 2 are configured to transmit and receive electromagnetic wave signals. Each antenna in the terminal device 100 may be configured to cover one or more communications bands. Different antennas may be further reused to improve antenna utilization. For example, the antenna 1 may be reused as a diversity antenna of a wireless local area network. In some other embodiments, the antenna may be used in combination with a tuning switch.

The mobile communications module 150 may provide a wireless communications solution, such as 2G/3G/4G/5G, that is applied to the terminal device 100. The mobile communications module 150 may include at least one filter, a switch, a power amplifier, a low noise amplifier, and the like. The mobile communications module 150 may receive an electromagnetic wave by using the antenna 1, perform processing such as filtering and amplification on the received electromagnetic wave, and transmit the received electromagnetic wave to the modem processor for demodulation. The mobile communications module 150 may further amplify a signal modulated by the modem processor, and convert the signal into an electromagnetic wave by using the antenna 1 and radiate the electromagnetic wave. In some embodiments, at least some functional modules of the mobile communications module 150 may be disposed in the processor 110. In some embodiments, at least some functional modules of the mobile communications module 150 and at least some modules of the processor 110 may be disposed in a same component.

The modem processor may include a modulator and a demodulator. The modulator is configured to modulate a to-be-sent low-frequency baseband signal into a medium-high-frequency signal. The demodulator is configured to demodulate a received electromagnetic wave signal into a low-frequency baseband signal. Then, the demodulator transmits the low-frequency baseband signal obtained through demodulation to the baseband processor for processing. After being processed by the baseband processor, the low-frequency baseband signal is transferred to the application processor. The application processor outputs a sound signal through an audio device (not limited to the speaker 170A, the receiver 170B, and the like), or displays an image or a video through the display screen 194. In some embodiments, the modem processor may be an independent component. In some other embodiments, the modem processor may be independent of the processor 110, and disposed in a same component as the mobile communications module 150 or another functional module.

The wireless communications module 160 may provide wireless communications solutions applied to the terminal device 100, such as a wireless local area network (WLAN), Bluetooth, a global navigation satellite system (GNSS), frequency modulation (FM), NFC, and an infrared (IR) technology. The wireless communications module 160 may be one or more components integrating at least one communication processing module. The wireless communications module 160 receives an electromagnetic wave by using the antenna 2, performs frequency modulation and filtering processing on the electromagnetic wave signal, and sends a processed signal to the processor 110. The wireless communications module 160 may further receive a to-be-sent signal from the processor 110, perform frequency modulation and amplification on the signal, and convert the signal into an electromagnetic wave by using the antenna 2 and radiate the electromagnetic wave.

In some embodiments, the antenna 1 of the terminal device 100 is coupled to the mobile communications module 150, and the antenna 2 is coupled to the wireless communications module 160, so that the terminal device 100 may communicate with a network and another device by using a wireless communications technology. The wireless communications technology may include GSM, GPRS, CDMA, WCDMA, TD-SCDMA, LTE, GNSS, WLAN, NFC, FM, and/or IR technologies. The GNSS may include a global positioning system (GPS), a global navigation satellite system (GLONASS), and a beidou navigation satellite system (BDS), a quasi-zenith satellite system (QZSS) and/or a satellite-based augmentation system (SBAS).

The terminal device 100 may implement a display function by using the GPU, the display screen 194, the application processor, and the like. The GPU is a microprocessor unit for image processing, and is connected to the display screen 194 and the application processor. The GPU is configured to perform mathematical and geometric calculations for graphics rendering. The processor 110 may include one or more GPUs that execute instructions to generate or change display information.

The display screen 194 is configured to display an image, a video, and the like. The display screen 194 includes a display panel. The display panel may be a liquid crystal display (LCD), an organic light-emitting diode (OLED), an active-matrix organic light-emitting diode (AMOLED), a flexible light-emitting diode (FLED), a Miniled, a MicroLed, a Micro-oLed, a quantum dot light-emitting diode (QLED), or the like. In some embodiments, the terminal device 100 may include one or N display screens 194, where N is a positive integer greater than 1.

The terminal device 100 may implement a photographing function by using the ISP, one or more cameras 193, the video codec, the GPU, the one or more display screens 194, the application processor, and the like.

The NPU is a neural-network (NN) computing processor. By drawing on a structure of a biological neural network, for example, by drawing on a transfer mode between human brain neurons, the NPU quickly processes input information, and may further continuously perform self-learning. Intelligent cognition application, for example, image recognition, facial recognition, speech recognition, and text understanding, of the terminal device 100 may be implemented by using the NPU.

The external memory interface 120 may be configured to connect to an external memory card, for example, a Micro SD card, to expand a storage capability of the terminal device 100. The external memory card communicates with the processor 110 through the external memory interface 120, to implement a data storage function. For example, data files such as music, photos, and videos are saved to the external memory card.

The internal memory 121 may be configured to store one or more computer programs, and the one or more computer programs include instructions. The processor 110 may run the instructions stored in the internal memory 121, so that the terminal device 100 performs the model inference method based on a graphics rendering pipeline provided in some embodiments of this application, various function applications and data processing, and the like. The internal memory 121 may include a program storage area and a data storage area. The program storage area may store an operating system. The program storage area may further store one or more application programs (for example, a gallery or a contact), and the like. The data storage area may store data (for example, a photo or a contact) and the like created in a process of using the terminal device 100. In addition, the internal memory 121 may include a high-speed random access memory, and may further include a non-volatile memory, such as at least one magnetic disk storage device, a flash storage device, or a universal flash storage (UFS). In some embodiments, the processor 110 may run the instructions stored in the internal memory 121 and/or the instructions stored in the memory disposed in the processor 110, so that the terminal device 100 performs the model inference method based on a graphics rendering pipeline provided in the embodiments of this application, and various functional applications and data processing.

The terminal device 100 may implement an audio function, such as music playback or recording, by using the audio module 170, the speaker 170A, the receiver 170B, the microphone 170C, the headset interface 170D, the application processor, and the like. The audio module 170 is configured to convert digital audio information into an analog audio signal for output, or configured to convert an analog audio input into a digital audio signal. The audio module 170 may be further configured to encode and decode an audio signal. In some embodiments, the audio module 170 may be disposed in the processor 110, or some functional modules of the audio module 170 may be disposed in the processor 110. The speaker 170A, also referred to as a "horn", is configured to convert an audio electrical signal into a sound signal. The terminal device 100 may listen to music or listen to a hands-free call by using the speaker 170A. The receiver 170B, also referred to as a "handset", is configured to convert an audio electrical signal into a sound signal. When the terminal device 100 answers a call or voice information, the receiver 170B may be placed close to a human ear to receive voice. The microphone 170C, also referred to as a "mike" or a "MIC", is configured to convert a sound signal into an electrical signal. When making a call or sending voice information, a user may make a voice by approaching a human mouth to the microphone 170C, and input the sound signal to the microphone 170C. At least one microphone 170C may be disposed in the terminal device 100. In some other embodiments, two microphones 170C may be disposed in the terminal device 100, and in addition to collecting a sound signal, the terminal device 100 may further implement a noise reduction function. In some other embodiments, three, four, or more microphones 170C may be disposed in the terminal device 100, to collect a sound signal, reduce noise, identify a sound source, implement a directional recording function, and the like. The headset interface 170D is configured to connect to a wired headset. The headset interface 170D may be a USB interface 130, or may be a 3.5 mm open mobile terminal platform (OMTP) standard interface, or may be a cellular telecommunications industry association of the USA (CTIA) standard interface.

The sensor 180 may include a pressure sensor 180A, a gyro sensor 180B, a barometric sensor 180C, a magnetic sensor 180D, an acceleration sensor 180E, a distance sensor 180F, a proximity sensor 180G, a fingerprint sensor 180H, a temperature sensor 180J, a touch sensor 180K, an ambient light sensor 180L, a bone conduction sensor 180M, or the like.

The pressure sensor 180A is configured to sense a pressure signal, and may convert the pressure signal into an electrical signal. In some embodiments, the pressure sensor 180A may be disposed in the display screen 194. There are many types of pressure sensors 180A, such as a resistive pressure sensor, an inductive pressure sensor, a capacitive pressure sensor, and the like. The capacitive pressure sensor may be at least two parallel plates including electrically conductive materials. When a force is applied to the pressure sensor 180A, a capacitance between electrodes changes. The terminal device 100 determines a strength of the pressure based on the change of the capacitance. When a touch operation acts on the display screen 194, the terminal device 100 detects a touch operation strength based on the pressure sensor 180A. Alternatively, the terminal device 100 may calculate a touch position based on a detection signal of the pressure sensor 180A. In some embodiments, touch operations that act on a same touch location but have different touch operation strengths may correspond to different operation instructions. For example, when a touch operation whose touch operation strength is less than a first pressure threshold acts on a short message application icon, an instruction for viewing a short message is executed. When a touch operation whose touch operation strength is greater than or equal to the first pressure threshold acts on the short message application icon, an instruction for creating a short message is executed.

The gyro sensor 180B may be configured to determine a motion posture of the terminal device 100. In some embodiments, angular velocities of the terminal device 100 around three axes (namely, x, y, and z axes) may be determined by using the gyro sensor 180B. The gyro sensor 180B may be configured for image stabilization. For example, when the shutter is pressed, the gyro sensor 180B detects an angle of shake of the terminal device 100, calculates, based on the angle, a distance that needs to be compensated by a lens module, and enables the lens to cancel the shake of the terminal device 100 by reverse motion, thereby implementing anti-shake. The gyro sensor 180B may further be configured for navigation, somatosensory game scenes, and the like.

The acceleration sensor 180E may detect magnitudes of accelerations of the terminal device 100 in all directions (usually three axes). When the terminal device 100 is stationary, the acceleration sensor 180E may detect a magnitude and a direction of gravity. The acceleration sensor 180E may alternatively be configured to identify a posture of the terminal device, and is applied to applications such as landscape/portrait screen switching and a pedometer.

The distance sensor 180F is configured to measure a distance. The terminal device 100 may measure a distance by using infrared or laser. In some embodiments, for photographing a scene, the terminal device 100 may measure a distance by using the distance sensor 180F, to implement fast focusing.

The proximity sensor 180G may include, for example, a light-emitting diode (LED) and a light detector, such as a photodiode. The light-emitting diode may be an infrared light-emitting diode. The terminal device 100 emits infrared light outwards by using the light-emitting diode. The terminal device 100 detects infrared reflected light from a nearby object by using the photodiode. When sufficient reflected light is detected, it may be determined that there is an object near the terminal device 100. When detecting insufficient reflected light, the terminal device 100 may determine that there is no object near the terminal device 100. The terminal device 100 may detect, by using the proximity sensor 180G, that the user holds the terminal device 100 close to the ear for a call, to automatically turn off the screen to save power. The proximity sensor 180G may alternatively be configured in a holster mode, and a pocket mode automatically unlocks and locks the screen.

The ambient light sensor 180L is configured to sense ambient brightness. The terminal device 100 may adaptively adjust brightness of the display screen 194 based on the sensed ambient brightness. The ambient light sensor 180L may alternatively be configured to automatically adjust white balance during photographing. The ambient light sensor 180L may further cooperate with the proximity sensor 180G to detect whether the terminal device 100 is in a pocket, to prevent accidental touch.

The fingerprint sensor 180H (also referred to as a fingerprint identifier) is configured to collect a fingerprint. The terminal device 100 may implement fingerprint unlocking, accessing an application lock, fingerprint photographing, fingerprint answering an incoming call, and the like by using features of the collected fingerprint. In addition, for other descriptions about the fingerprint sensor, refer to International Patent Application PCT/CN2017/082773 entitled "NOTIFICATION PROCESSING METHOD AND TERMINAL DEVICE", which is incorporated herein by reference in its entirety.

The touch sensor 180K may also be referred to as a touch panel or a touch-sensitive surface. The touch sensor 180K may be disposed in the display screen 194, and the touch sensor 180K and the display screen 194 form a touchscreen, which is also referred to as a touch control screen. The touch sensor 180K is configured to detect a touch operation acting on or near the touch sensor 180K. The touch sensor may transfer the detected touch operation to the application processor, to determine a touch event type. A visual output related to the touch operation may be provided by using the display screen 194. In some other embodiments, the touch sensor 180K may alternatively be disposed on a surface of the terminal device 100, and a position of the touch sensor 180K is different from that of the display screen 194.

The bone conduction sensor 180M may obtain a vibration signal. In some embodiments, the bone conduction sensor 180M may obtain a vibration signal of a vocal vibration bone block of a human body. The bone conduction sensor 180M may alternatively be in contact with a pulse of a human body and receive a blood pressure pulse signal. In some embodiments, the bone conduction sensor 180M may alternatively be disposed in a headset to be combined as a bone conduction headset. The audio module 170 may parse out a voice signal based on the vibration signal that is of the vocal vibration bone block and that is obtained by the bone conduction sensor 180M, to implement a voice function. The application processor may parse heart rate information based on the blood pressure pulse signal obtained by the bone conduction sensor 180M, to implement a heart rate detection function.

The key 190 includes a power key, a volume key, and the like. The key 190 may be a mechanical key, or may be a touch key. The terminal device 100 may receive a key input, and generate a key signal input related to user setting and function control of the terminal device 100.

The SIM card interface 195 is configured to connect to a SIM card. The SIM card may be inserted into the SIM card interface 195 or removed from the SIM card interface 195, to implement contact with and separation from the terminal device 100. The terminal device 100 may support one or N SIM card interfaces, where N is a positive integer greater than 1. The SIM card interface 195 may support a Nano SIM card, a Micro SIM card, a SIM card, and the like. A plurality of cards may be inserted into the same SIM card interface 195 at the same time. Types of the plurality of cards may be the same or may be different. The SIM card interface 195 may alternatively be compatible with different types of SIM cards. The SIM card interface 195 may alternatively be compatible with an external memory card. The terminal device 100 interacts with a network by using a SIM card, to implement functions such as a call and data communication. In some embodiments, the terminal device 100 uses an eSIM, namely, an embedded SIM card. The eSIM card may be embedded in the terminal device 100, and cannot be separated from the terminal device 100.

In addition, an embodiment of this application further provides a computer readable storage medium. The computer readable storage medium stores computer executable instructions. When at least one processor of user equipment executes the computer executable instructions, the user equipment performs the foregoing various possible methods.

The computer readable medium includes a computer storage medium and a communication medium, where the communication medium includes any medium that facilitates transferring a computer program from one place to another. The storage medium may be any available medium accessible to a general-purpose or dedicated computer. An example storage medium is coupled to a processor, so that the processor can read information from the storage medium and write information to the storage medium. Certainly, the storage medium may alternatively be a component of the processor. The processor and the storage medium may be located in an ASIC. In addition, the ASIC may be located in the user equipment. Certainly, the processor and the storage medium may alternatively exist in a communications device as discrete components.

Persons of ordinary skill in the art may understand that all or some of the steps of the foregoing method embodiments may be implemented by a program instructing related hardware. The program may be stored in a computer readable storage medium. When the program is executed, steps including the foregoing method embodiments are performed. The storage medium includes any medium that can store program code, such as a ROM, a RAM, a magnetic disk, or an optical disc.

Finally, it should be noted that the foregoing embodiments are merely used to describe the technical solutions of this application, but are not intended to limit the technical solutions. Although this application is described in detail with reference to the foregoing embodiments, persons of ordinary skill in the art should understand that they can still make modifications to the technical solutions described in the foregoing embodiments, or make equivalent replacements to some or all technical features thereof. These modifications or replacements do not depart from the scope of the technical solutions of the embodiments of this application.

What is claimed is:

1. A model inference method based on a graphics rendering pipeline, comprising:
   obtaining an instruction stream in a render thread;
   extracting and saving texture data information from the instruction stream, wherein the texture data information comprises texture data; and
   inputting the texture data information to a graphics processing unit (GPU) rendering pipeline, wherein the GPU rendering pipeline performs GPU model-based inference on the texture data based on a GPU model to obtain an inference result of the texture data, and the GPU model is a model running in a GPU,
   wherein the method further comprises:
   before inputting the texture data information to the GPU rendering pipeline, obtaining and saving an ID of a texture in an activated state; and
   obtaining the inference result by using the render thread, wherein the inference result is saved in a texture data format.

2. The method according to claim 1, further comprising:
   loading the GPU model to a memory.

3. The method according to claim 2, wherein the loading of the GPU model to the memory comprises:
   obtaining a layered structure of a training model and parameters of each layer in the render thread;
   generating, based on the layered structure and the parameters of each layer, a fragment shader corresponding to each layer in the layered structure; and
   loading the fragment shader to the memory.

4. The method according to claim 2, wherein the loading of the GPU model to the memory comprises:
   obtaining a layered structure of a training model and parameters of each layer in the render thread;
   merging the layered structure and the parameters of each layer based on the layered structure, to obtain a merged layered structure and a merged parameter of each layer;
   generating, based on the merged layered structure and the merged parameter of each layer, a fragment shader corresponding to each layer in the merged layered structure; and
   loading the fragment shader to the memory.

5. The method according to claim 4, wherein the merging of the layered structure and the parameters of each layer based on the layered structure comprises:
   determining a plurality of branch layers and a plurality of 1*1 convolution kernels in the layered structure; and
   merging the plurality of branch layers and multi-layer parameters corresponding to the plurality of branch layers, and/or merging the plurality of 1*1 convolution kernels and a plurality of parameters corresponding to the plurality of 1*1 convolution kernels.

6. A model inference method based on a graphics rendering pipeline, comprising:
   obtaining an instruction stream in a render thread;
   extracting and saving texture data information from the instruction stream, wherein the texture data information comprises texture data; and
   inputting the texture data information to a graphics processing unit (GPU) rendering pipeline, wherein the GPU rendering pipeline performs GPU model-based inference on the texture data based on a GPU model to obtain an inference results of the texture data, and the GPU model is a model running in a GPU,
   wherein the method further comprises loading the GPU model to a memory,
   wherein the loading of the GPU model to the memory comprises:
   obtaining a layered structure of a training model and parameters of each layer in the render thread;
   generating, based on the layered structure and the parameters of each layer, a fragment shader corresponding to each layer in the layered structure; and
   loading the fragment shader to the memory, and
   wherein the texture data information further comprises a texture ID of the texture data in a GPU memory, and before inputting the texture data information to the graphics processing unit (GPU) rendering pipeline, the method further comprises:
   determining an input data position and an output data position of the fragment shader corresponding to each layer based on the texture ID and the GPU model, wherein the GPU rendering pipeline sequentially executes the fragment shader corresponding to each layer based on the input data position and the output data position of the fragment shader corresponding to each layer.

7. The method according to claim 6, further comprising:
   before inputting the texture data information to the graphics processing unit (GPU) rendering pipeline, preprocessing the texture data information; and
   after obtaining the inference result of the texture data, post-processing the inference result.

8. The method according to claim 7, wherein the texture data information further comprises a first save format of the texture data in the GPU memory and a first image size of the texture data, and the preprocessing of the texture data information comprises:
   converting the first image size into a second image size based on the GPU model; and
   converting the first save format into a second save format required by the GPU model; and
   the post-processing of the inference result comprises:
   converting the second image size of the texture data into the first image size, and converting the second save format of the texture data into the first save format.

9. The method according to claim 1, further comprising:
   before inputting the texture data information to the GPU rendering pipeline, obtaining and saving a context state of the render thread, and an ID of a GPU executive program in an activated state; and restoring the context state of the render thread, the ID of the texture, and the ID of the GPU executive program.

10. A model inference method based on a graphics rendering pipeline, comprising:
receiving texture data information transmitted by a central processing unit (CPU), wherein the texture data information is obtained by the CPU from an instruction stream in a render thread, the texture data information comprises texture data, and an ID of a texture in an activated state is obtained and saved by the CPU before the CPU transmits the texture data information;
performing GPU model-based inference on the texture data in a graphics processing unit (GPU) rendering pipeline based on a GPU model to obtain an inference result of the texture data, wherein the GPU model is a model running in a GPU, wherein the inference result is obtained by using the render thread, and the inference result is saved in a texture data format; and
outputting the inference result to the render thread, wherein the inference result is in a texture data format.

11. The method according to claim 10, wherein the performing of the GPU model-based inference on the texture data in the graphics processing unit (GPU) rendering pipeline comprises:
sequentially executing a fragment shader of each layer by using the GPU rendering pipeline based on an input data position and an output data position of the fragment shader of each layer, wherein
the fragment shader is a fragment shader corresponding to each layer in a layered structure generated by the CPU based on a layered structure of a training model and parameters of each layer in the render thread; or
the fragment shader is a fragment shader corresponding to each layer in a merged layered structure generated by the CPU based on a merged layered structure of a training model and a merged parameter of each layer in the render thread.

12. A model inference apparatus based on a graphics rendering pipeline, comprising at least one processor, wherein the at least one processor is configured to:
obtain an instruction stream in a render thread;
extract and save texture data information from the instruction stream, wherein the texture data information comprises texture data; and
input the texture data information to a graphics processing unit (GPU) rendering pipeline, wherein the GPU rendering pipeline performs GPU model-based inference on the texture data based on a GPU model to obtain an inference result of the texture data, and the GPU model is a model running in a GPU,
wherein the at least one processor is further configured to:
before inputting the texture data information to the GPU rendering pipeline, obtain and save an ID of a texture in an activated state; and
obtain the inference result by using the render thread, wherein the inference result is saved in a texture data format.

13. The apparatus according to claim 12, wherein the at least one processor is further configured to load the GPU model to a memory.

14. The apparatus according to claim 13, wherein the loading of the GPU model comprises:
obtaining a layered structure of a training model and parameters of each layer in the render thread;
generating, based on the layered structure and the parameters of each layer, a fragment shader corresponding to each layer in the layered structure; and
loading the fragment shader to the memory.

15. The apparatus according to claim 13, wherein the loading of the GPU model comprises:
obtaining a layered structure of a training model and parameters of each layer in the render thread;
merging the layered structure and the parameters of each layer based on the layered structure, to obtain a merged layered structure and a merged parameter of each layer;
generating, based on the merged layered structure and the merged parameter of each layer, a fragment shader corresponding to each layer in the merged layered structure; and
loading the fragment shader to the memory.

16. The apparatus according to claim 15, wherein the loading of the GPU model comprises:
determining a plurality of branch layers and a plurality of 1*1 convolution kernels in the layered structure; and
merging the plurality of branch layers and multi-layer parameters corresponding to the plurality of branch layers, and/or merging the plurality of 1*1 convolution kernels and a plurality of parameters corresponding to the plurality of 1*1 convolution kernels.

17. A model inference apparatus based on a graphics rendering pipeline, comprising at least one processor, wherein the at least one processor is configured to:
obtain an instruction stream in a render thread;
extract and save texture data information from the instruction stream, wherein the texture data information comprises texture data; and
input the texture data information to a graphics processing unit (GPU) rendering pipeline, wherein the GPU rendering pipeline performs GPU model-based inference on the texture data based on a GPU model to obtain an inference result of the texture data, and the GPU model is a model running in a GPU,
wherein the at least one processor is further configured to load the GPU model to a memory;
wherein the loading of the GPU model comprises:
obtaining a layered structure of a training model and parameters of each layer in the render thread;
generating, based on the layered structure and the parameters of each layer, a fragment shader corresponding to each layer in the layered structure; and
loading the fragment shader to the memory, and
wherein the texture data information further comprises a texture ID of the texture data in a GPU memory, and the at least one processor is further configured to determine an input data position and an output data position of the fragment shader corresponding to each layer based on the texture ID and the GPU model, wherein the GPU rendering pipeline sequentially executes the fragment shader corresponding to each layer based on the input data position and the output data position of the fragment shader corresponding to each layer.

18. The apparatus according to claim 17, wherein the at least one processor is further configured to:
preprocess the texture data information; and
post-process the inference result.

19. The apparatus according to claim 18, wherein the texture data information further comprises a first save format of the texture data in the GPU memory and a first image size of the texture data, and the at least one processor is further configured to:
convert the first image size into a second image size based on the GPU model;
convert the first save format into a second save format required by the GPU model; and convert the second image size of the texture data into the first image size, and convert the second save format of the texture data into the first save format.

20. The apparatus according to claim 12, the at least one processor is further configured to:
obtain and save a context state of the render thread, and an ID of a GPU execution program in an activated state; and
restore the context state of the render thread, the ID of the texture, and the ID of the GPU execution program.

* * * * *

UNITED STATES PATENT AND TRADEMARK OFFICE
CERTIFICATE OF CORRECTION

PATENT NO. : 11,941,724 B2
APPLICATION NO. : 17/665678
DATED : March 26, 2024
INVENTOR(S) : Xindong Shi et al.

It is certified that error appears in the above-identified patent and that said Letters Patent is hereby corrected as shown below:

In the Claims

Column 32, Claim 6, Line 19 change "results" to --result--.

Signed and Sealed this
First Day of October, 2024

Katherine Kelly Vidal
*Director of the United States Patent and Trademark Office*